US010571649B2

(12) United States Patent
Osaka et al.

(10) Patent No.: US 10,571,649 B2
(45) Date of Patent: Feb. 25, 2020

(54) LENS DRIVING DEVICE, CAMERA MODULE, AND CAMERA-MOUNTED DEVICE

(71) Applicants: Tomohiko Osaka, Tokyo (JP); Atsushi Kikuchi, Tokyo (JP); Minoru Katagiri, Tokyo (JP)

(72) Inventors: Tomohiko Osaka, Tokyo (JP); Atsushi Kikuchi, Tokyo (JP); Minoru Katagiri, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/267,465

(22) Filed: Feb. 5, 2019

(65) Prior Publication Data
US 2019/0243087 A1 Aug. 8, 2019

(30) Foreign Application Priority Data
Feb. 5, 2018 (JP) .................................. 2018-018462

(51) Int. Cl.
G02B 7/09 (2006.01)
G03B 3/10 (2006.01)
(Continued)

(52) U.S. Cl.
CPC ................. G02B 7/09 (2013.01); G03B 3/10 (2013.01); H02K 41/0354 (2013.01);
(Continued)

(58) Field of Classification Search
None
See application file for complete search history.

(56) References Cited

U.S. PATENT DOCUMENTS

2015/0309282 A1* 10/2015 Lee ......................... G02B 7/09
359/814
2016/0048033 A1* 2/2016 Kim ..................... G02B 27/646
348/357
(Continued)

FOREIGN PATENT DOCUMENTS

JP 2012-177753 A 9/2012
JP 2013-210550 A 10/2013

OTHER PUBLICATIONS

Extended European Search Report for EP19155340.3 dated Jul. 8, 2019, 7 pages.

Primary Examiner — James M Hannett
(74) Attorney, Agent, or Firm — Brundidge & Stanger, P.C.

(57) ABSTRACT

A lens driving device includes an auto-focusing driving part that includes an auto-focusing coil and driving magnets, and an optical image stabilization driving part that includes an optical image stabilization coil disposed so as to be spaced apart from the driving magnets in an optical-axis direction and the driving magnets. An autofocus fixing part includes a magnet holder to which the driving magnets are fixed by adhesion, and adhesion surfaces of the magnet holder to which the driving magnets adhere are parallel to the optical-axis direction, and first end portions of the adhesion surfaces facing an optical image stabilization fixing part in the optical-axis direction are opened. Each adhesion surface includes a recessed portion that extends in the optical-axis direction toward a second end portion, which is opposite to the first end portion, from a portion positioned closer to an inside than the first end portion.

13 Claims, 25 Drawing Sheets

(51) Int. Cl.
*H02K 41/035* (2006.01)
*H04M 1/02* (2006.01)
*H04N 5/225* (2006.01)
*H04N 5/232* (2006.01)

(52) U.S. Cl.
CPC ........ *H04M 1/0264* (2013.01); *H04N 5/2253* (2013.01); *H04N 5/23287* (2013.01); *G03B 2205/0069* (2013.01)

(56) References Cited

U.S. PATENT DOCUMENTS

| | | | |
|---|---|---|---|
| 2016/0178925 A1* | 6/2016 | Park | H04N 5/2254 |
| | | | 359/557 |
| 2016/0274328 A1 | 9/2016 | Shin et al. | |
| 2017/0082827 A1* | 3/2017 | Park | G02B 7/08 |
| 2017/0097517 A1 | 4/2017 | Chen et al. | |
| 2018/0031858 A1 | 2/2018 | Gomyo et al. | |
| 2018/0113274 A1* | 4/2018 | Jung | H02K 11/33 |

* cited by examiner

LENS DRIVING DEVICE, CAMERA MODULE, AND CAMERA-MOUNTED DEVICE

CROSS REFERENCE TO RELATED APPLICATIONS

This application is entitled to and claims the benefit of Japanese Patent Application No. 2018-018462, filed on Feb. 5, 2018, the disclosure of which including the specification, drawings and abstract is incorporated herein by reference in its entirety.

TECHNICAL FIELD

The present invention relates to a lens driving device for autofocus and optical image stabilization, a camera module, and a camera-mounted device.

BACKGROUND ART

In general, a small-sized camera module is mounted in a portable terminal, such as a smartphone. A lens driving device, which has an autofocus function to automatically perform focusing during imaging a subject (hereinafter, referred to as an "AF function") and an optical image stabilization function (hereinafter, referred to as an "OIS function") to optically correct shake (vibration) generated during imaging and reduce distortion of an image, is applied to such a camera module (for example, PTL 1 and PTL 2).

The lens driving device having an autofocus function and an optical image stabilization function includes an auto-focusing driving part (hereinafter, referred to as an "AF driving part") that moves a lens part in an optical-axis direction and an optical image stabilization driving part (hereinafter, referred to as an "OIS driving part") that allows the lens part to sway in a plane orthogonal to the optical-axis direction. In PTL 1 and PTL 2, a voice coil motor (VCM) is applied to the AF driving part and the OIS driving part.

An AF driving part employing a VCM driving system includes, for example, an auto-focusing coil (hereinafter, referred to as an "AF coil") that is disposed around a lens part and an auto-focusing magnets (hereinafter, referred to as "AF magnets") that are disposed so as to spaced apart from the AF coil in a radial direction. An autofocus movable part (hereinafter, referred to as an "AF movable part") including the lens part and the AF coil is supported by an autofocus support part (hereinafter, referred to as an "AF support part", for example, a leaf spring) in a state where the autofocus movable part is spaced apart from an autofocus fixing part (hereinafter, referred to as an "AF fixing part") including the AF magnets in a radial direction. The AF movable part is moved in the optical-axis direction by the driving force of a voice coil motor including the AF coil and the AF magnets, so that focusing is automatically performed. Here, the "radial direction" is a direction orthogonal to the optical axis.

The OIS driving part employing a VCM driving system includes, for example, optical image stabilization magnets (hereinafter, referred to as "OIS magnets") that are disposed in the AF driving part and optical image stabilization coils (hereinafter, referred to as "OIS coils") that are arranged so as to be spaced apart from the OIS magnets in the optical-axis direction. An optical image stabilization movable part (hereinafter, referred to as an "OIS movable part") including the AF driving part and the OIS magnets is supported by an optical image stabilization support part (hereinafter, referred to as an "OIS support part", for example, suspension wires) in a state where the optical image stabilization movable part is spaced apart from an optical image stabilization fixing part (hereinafter, referred to as an "OIS fixing part") including the OIS coils in the optical-axis direction. The OIS movable part is allowed to sway in a plane orthogonal to the optical-axis direction by the driving force of a voice coil motor including the OIS magnets and the OIS coils, so that optical image stabilization is performed.

CITATION LIST

Patent Literature

PTL 1
Japanese Patent Application Laid-Open No. 2013-210550
PTL 2
Japanese Patent Application Laid-Open No. 2012-177753

SUMMARY OF INVENTION

Technical Problem

In recent years, a reduction in the size and weight of a lens driving device has been required for a reduction in the size (thickness) and weight of a camera-mounted device, such as a smartphone.

An object of the present invention is to provide a lens driving device, a camera module, and a camera-mounted device that can be reduced in size and weight and can be improved in reliability.

Solution to Problem

A lens driving device according to the present invention includes:

an optical image stabilization driving part that includes: optical image stabilization magnets disposed around a lens part; and an optical image stabilization coil disposed so as to be spaced apart from the optical image stabilization magnets in an optical-axis direction, the optical image stabilization driving part being configured to cause an optical image stabilization movable part including the optical image stabilization magnets to sway in a plane orthogonal to the optical-axis direction with respect to an optical image stabilization fixing part including the optical image stabilization coil, in which the optical image stabilization movable part includes a magnet holder to which the optical image stabilization magnets are fixed by adhesion, in which:

adhesion surfaces of the magnet holder to which the optical image stabilization magnets adhere are parallel to the optical-axis direction, and first end portions of the adhesion surfaces facing the optical image stabilization fixing part in the optical-axis direction are opened, and each of the adhesion surfaces includes a recessed portion that extends in the optical-axis direction from an inner side relative to the first end portion toward a second end portion on a side opposite to the first end portion.

A camera module according to the present invention includes:

the lens driving device described above;
the lens part that is mounted on the autofocus movable part; and
a capturing part that captures a subject image formed by the lens part.

A camera-mounted device according to the present invention is a that is a camera-mounted device that is an information device or a transporting device, the camera-mounted device including:

the camera module described above; and an image processing part that processes image information obtained by the camera module.

Advantageous Effects of Invention

According to the present invention, the lens driving device, the camera module, and the camera-mounted device can be reduced in size and weight and can be improved in reliability.

DESCRIPTION OF EMBODIMENTS

An embodiment of the present invention will be described in detail below with reference to the drawings.

Figure 1A:
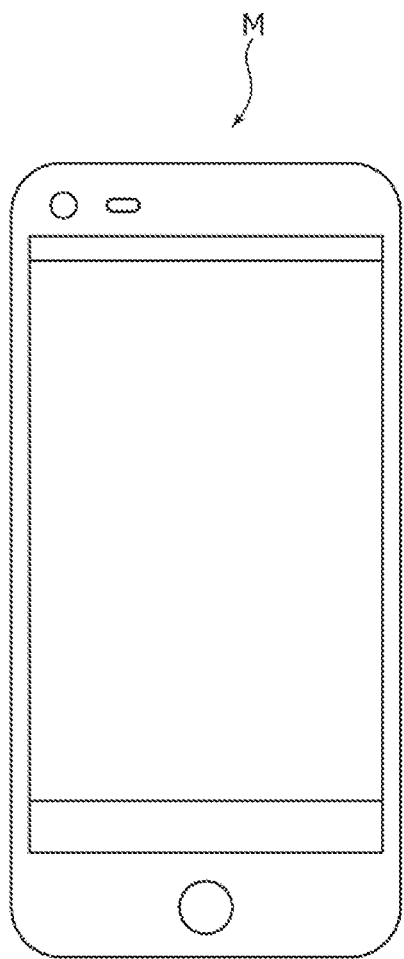
FIGS. 1A and 1B are diagrams showing a smartphone on which a camera module according to an embodiment of the present invention is mounted.
Figure 1B:
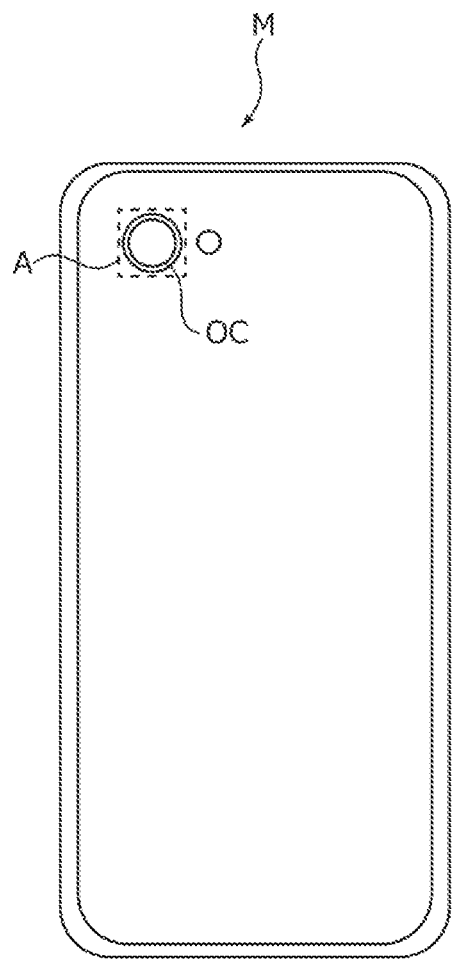

FIGS. 1A and 1B are diagrams showing smartphone M (camera-mounted device) on which camera module A according to an embodiment of the present invention is mounted. FIG. 1A is a front view of smartphone M, and FIG. 1B is a rear view of smartphone M.

Camera module A is mounted on smartphone M as, for example, rear camera OC. Camera module A has an AF function and an OIS function, automatically focuses on a subject to in a case where the subject is to be captured, and can capture an image without image shake by optically correcting shake (vibration) occurring during imaging.

Figure 2:
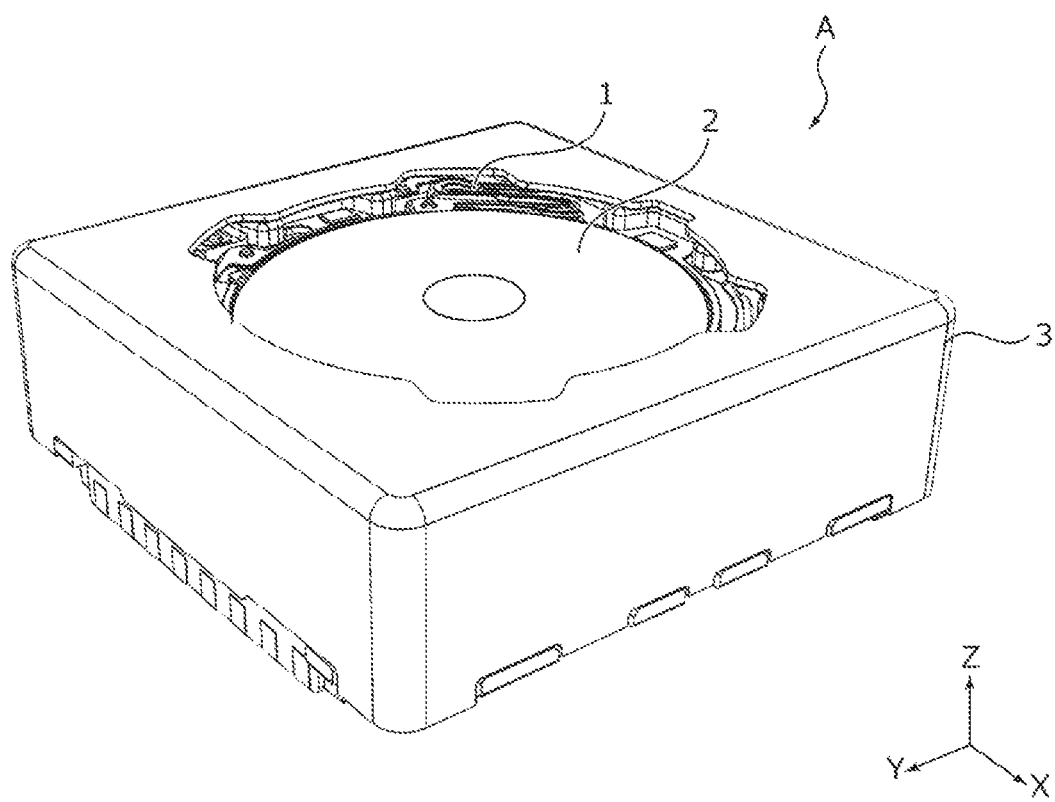
FIG. 2 is a perspective view showing the appearance of the camera module.
Figure 3:
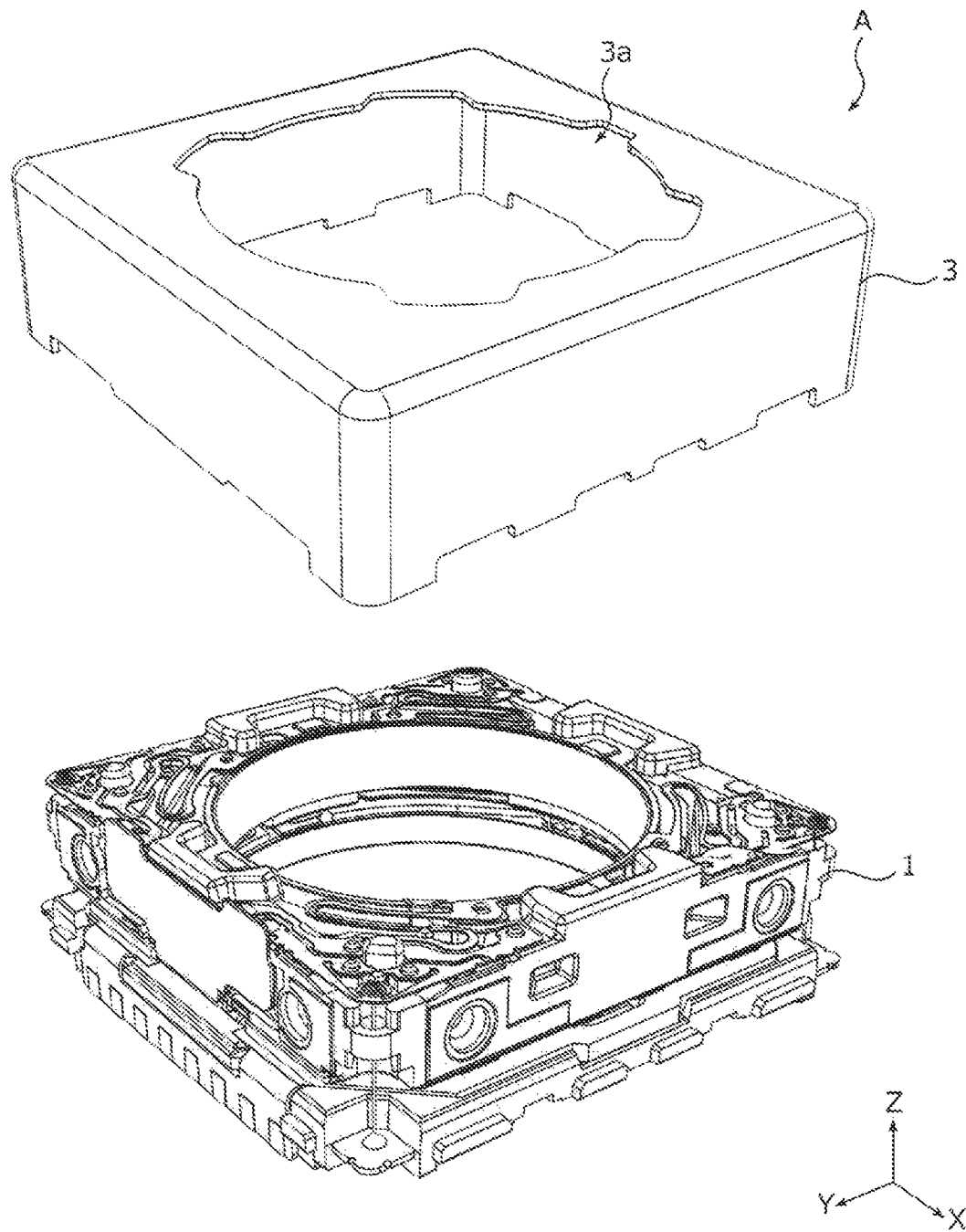
FIG. 3 is an exploded perspective view of the camera module.
Figure 4:
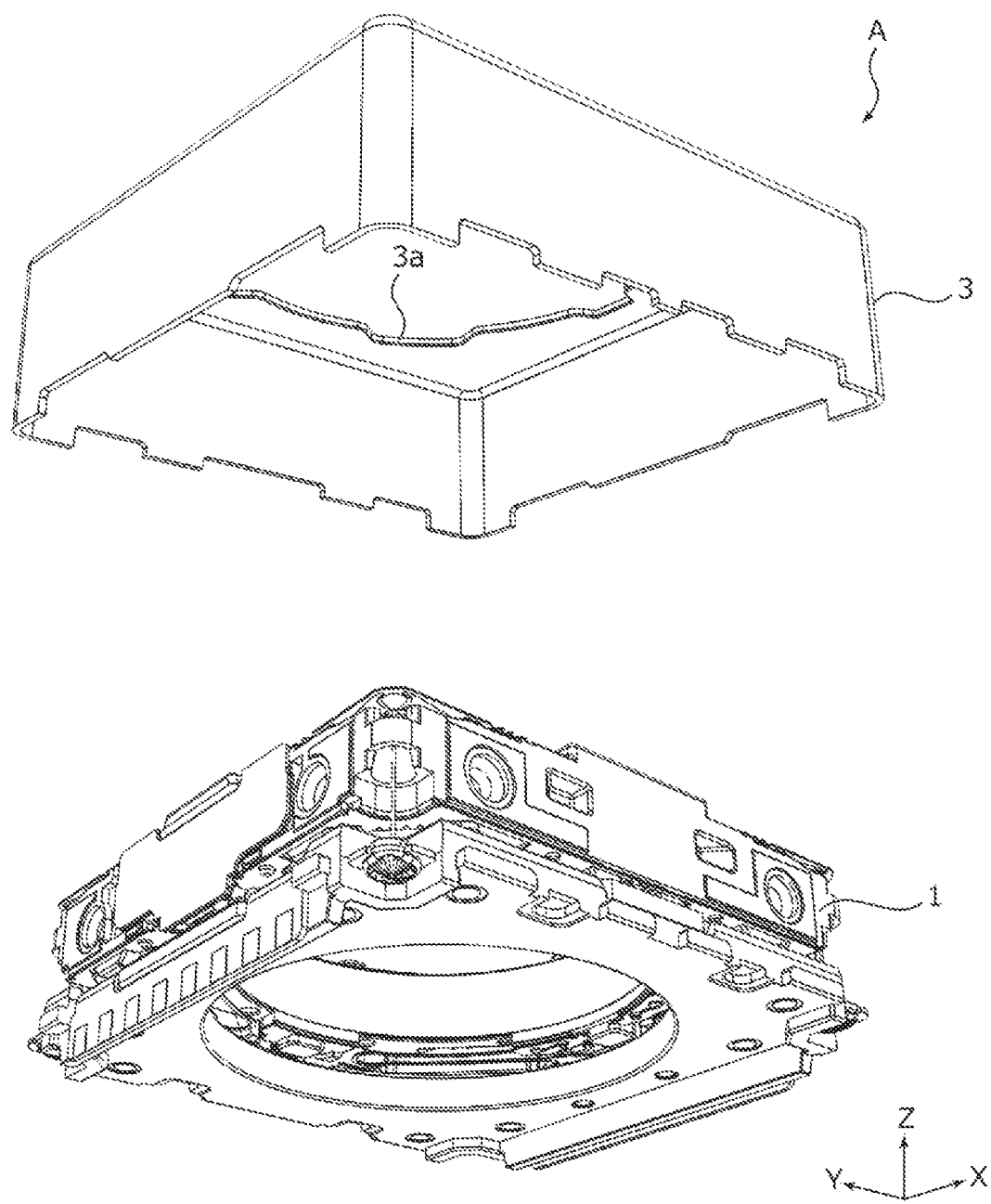
FIG. 4 is an exploded perspective view of the camera module.

FIG. 2 is a perspective view showing the appearance of camera module A. FIGS. 3 and 4 are exploded perspective views of camera module A. FIG. 3 is an upper perspective view, and FIG. 4 is a lower perspective view. As shown in FIGS. 2 to 4, description will be given in this embodiment with an orthogonal coordinate system (X, Y, Z). The same orthogonal coordinate system (X, Y, Z) is also used in the drawings to be described later. Further, intermediate directions between an X direction and a Y direction, that is, the diagonal directions of the planar shape of camera module A viewed in a Z direction are described as a U direction and a V direction (see FIG. 10).

Camera module A is mounted such that the X direction is a vertical direction (or a horizontal direction), the Y direction is a horizontal direction (or a vertical direction), and the Z direction is a front-rear direction in a case where a subject is actually captured by smartphone M. That is, the Z direction is the optical-axis direction, the upper side in the drawings is a light-receiving side in the optical-axis direction, and the lower side in the drawings is an image formation side in the optical-axis direction. Further, the X direction and the Y direction orthogonal to a Z axis are referred to as "optical-axis-orthogonal directions", and an XY plane is referred to as an "optical-axis-orthogonal plane".

As shown in FIGS. 2 to 4, camera module A includes: lens driving device 1 that realizes the AF function and the OIS function; lens part 2 that includes a cylindrical lens barrel and a lens housed in the lens barrel; a capturing part (not shown) that takes a subject image formed by lens part 2; cover 3 that covers the entire lens driving device 1, and the like. Lens part 2 is not shown in FIGS. 3 and 4.

Cover 3 is a barrel that includes a closed upper surface and has a rectangular shape in plan view viewed in the optical-axis direction. In this embodiment, cover 3 has a square shape in plan view. Cover 3 includes substantially circular opening 3a formed on the upper surface thereof. Lens part 2 faces the outside through opening 3a. Cover 3 is fixed to base 21 (see FIGS. 19 and 20) of OIS fixing part 20 of lens driving device 1 by, for example, adhesion.

The capturing part (not shown) is disposed on the image formation side of lens driving device 1 in the optical-axis direction. The capturing part (not shown) includes, for example, an image sensor board and an imaging element that is mounted on the image sensor board. The imaging element is formed of, for example, a charge-coupled device (CCD) image sensor, a complementary metal oxide semiconductor (CMOS) image sensor, or the like. The imaging element takes a subject image formed by lens part 2. Lens driving device 1 is mounted on the image sensor board (not shown) and is mechanically and electrically connected to the image sensor board. A control part, which controls the driving of lens driving device 1, may be provided on the image sensor board or may be provided on a camera-mounted device (in this embodiment, smartphone M) on which camera module A is mounted.

Figure 5:
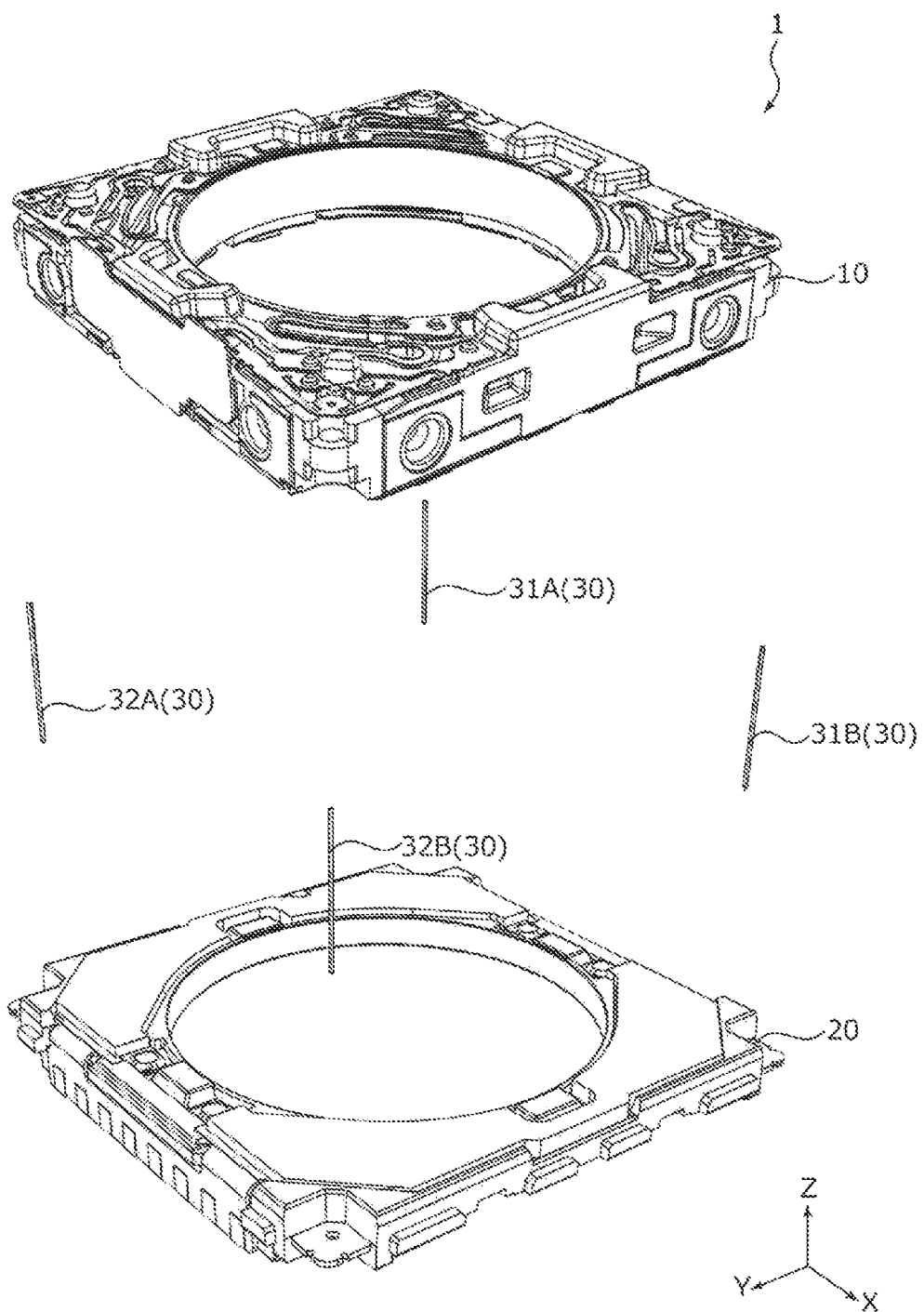
FIG. 5 is an exploded perspective view of a lens driving device.
Figure 6:
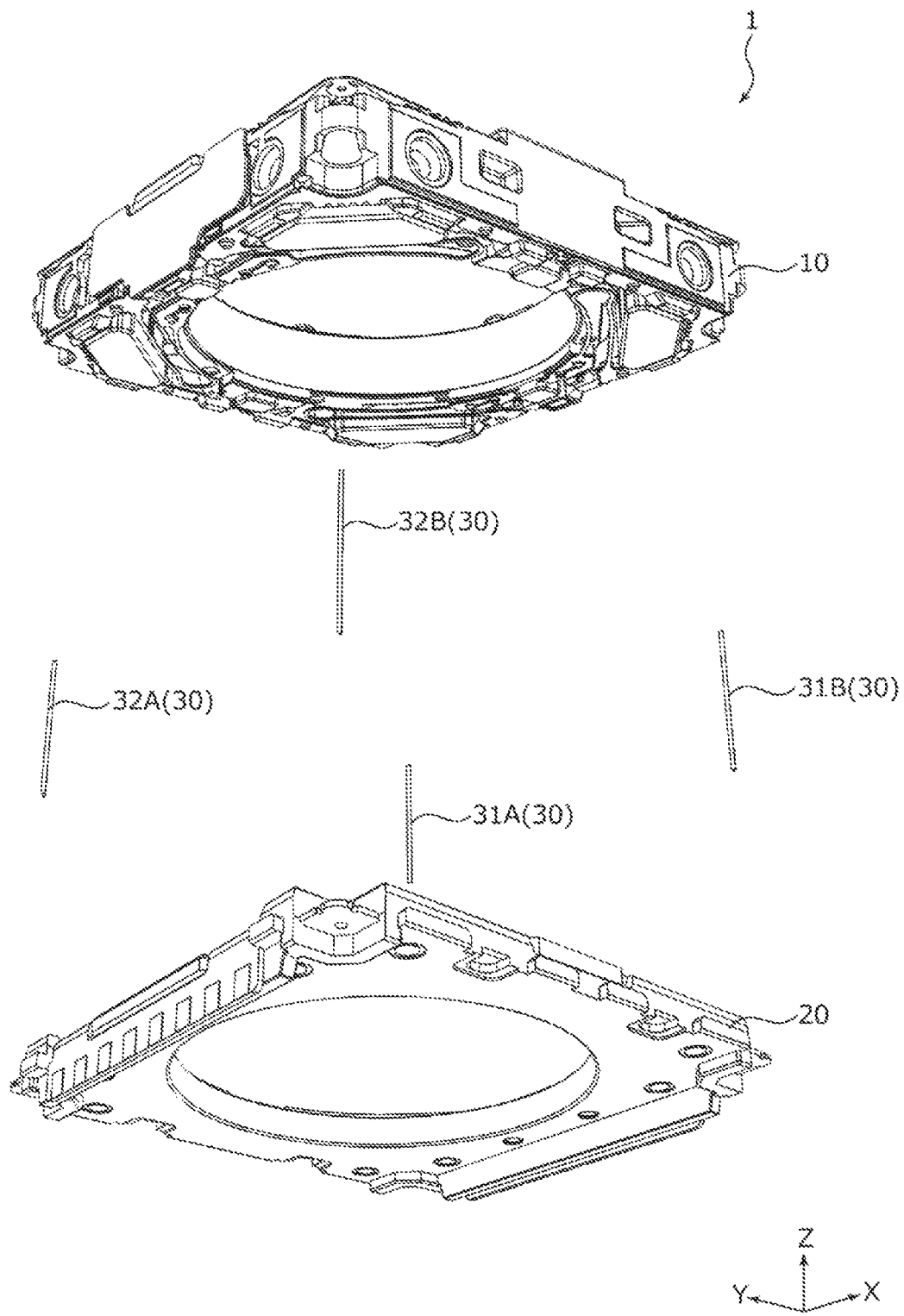
FIG. 6 is an exploded perspective view of the lens driving device.

FIGS. 5 and 6 are exploded perspective views of lens driving device 1. FIG. 5 is an upper perspective view and FIG. 6 is a lower perspective view.

As shown in FIGS. 5 and 6, in this embodiment, lens driving device 1 includes OIS movable part 10, OIS fixing part 20, OIS support part 30, and the like.

OIS movable part 10 includes driving magnets 122 (OIS magnets, see FIGS. 7 and 8) of OIS voice coil motors, and is a part that sways in the optical-axis-orthogonal plane during optical image stabilization. OIS fixing part 20 includes OIS coils 221 (see FIG. 19) of the OIS voice coil motors, and is a part that supports OIS movable part 10 through OIS support part 30. In other words, a moving magnet system is employed in an OIS driving part of lens driving device 1. OIS movable part 10 includes an AF driving part that includes AF movable part 11 and AF fixing part 12 (see FIGS. 7 and 8).

OIS movable part 10 is disposed on the light-receiving side in the optical-axis direction so as to be spaced apart from OIS fixing part 20, and is coupled to OIS fixing part 20 through OIS support part 30. In this embodiment, OIS support part 30 is formed of four suspension wires (hereinafter, referred to as "suspension wires 30") that extend in the optical-axis direction). The OIS support part may be formed of members other than suspension wires 30.

One end (an end portion facing the light-receiving side in the optical-axis direction, an upper end) of each suspension wire 30 is fixed to OIS movable part 10 (in this embodiment, AF support part 13 and AF power supply line 17 (see FIGS. 7 and 8)), and the other end (an end portion facing the image formation side in the optical-axis direction) thereof is fixed to OIS fixing part 20 (in this embodiment, base 21 (see FIGS. 19 and 20)). OIS movable part 10 is supported by suspension wires 30 so as to be swayable in the optical-axis-orthogonal plane.

In this embodiment, suspension wires 31A and 31B (hereinafter, referred to as "signal suspension wires 31A and 31B") of four suspension wires 30 are used as signal lines that transmit control signals to AF control part 16 (control IC 161, see FIG. 16). Suspension wires 32A and 32B (hereinafter, referred to as "power-feed suspension wires 32A and 32B") are used as power-feed lines to AF control part 16 (control IC 161).

Figure 7:
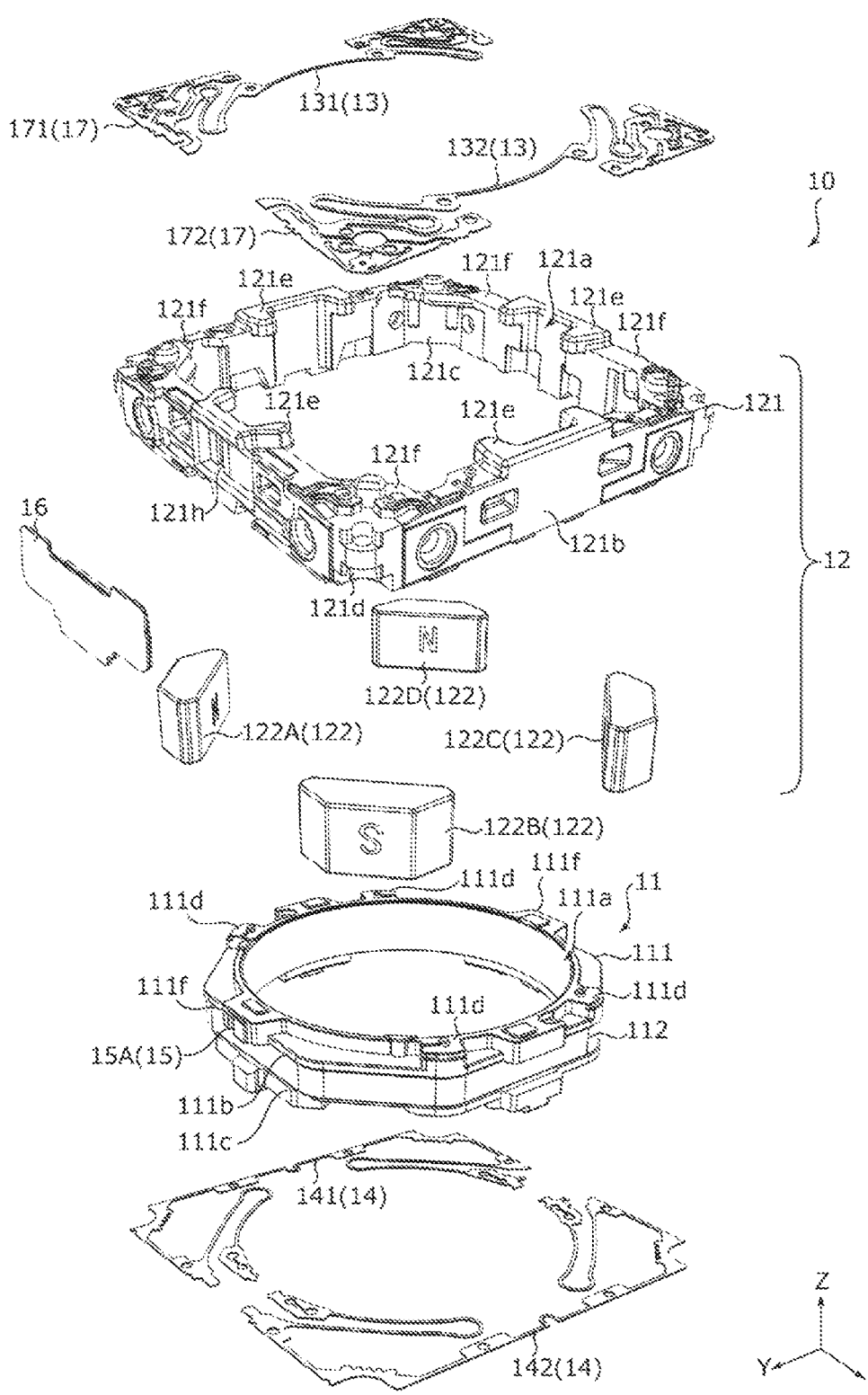
FIG. 7 is an exploded perspective view of an OIS movable part.
Figure 8:
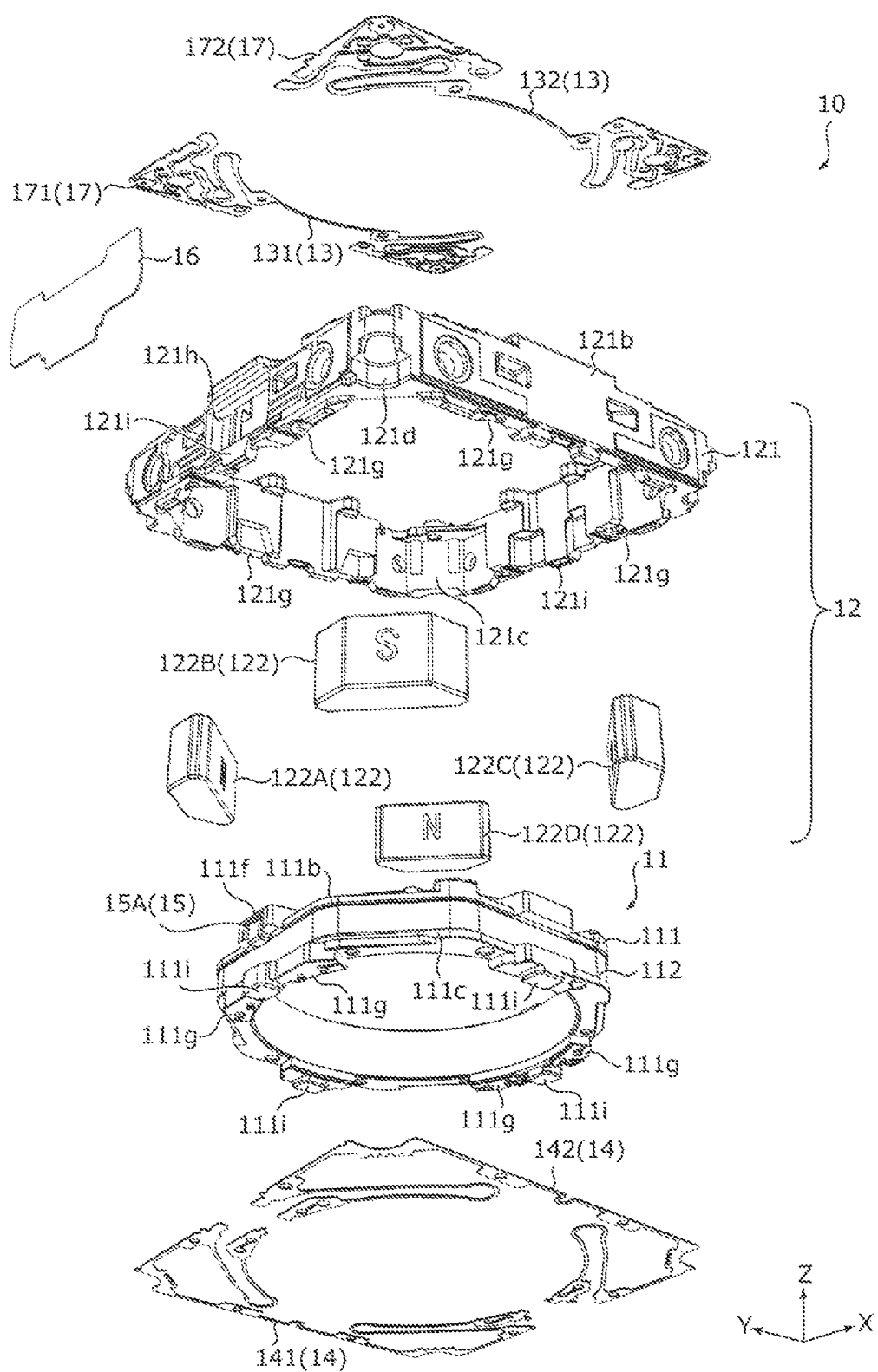
FIG. 8 is an exploded perspective view of the OIS movable part.

FIGS. 7 and 8 are exploded perspective views of OIS movable part 10. FIG. 7 is an upper perspective view and FIG. 8 is a lower perspective view.

As shown in FIGS. 7 and 8, in this embodiment, OIS movable part 10 includes AF movable part 11, AF fixing part 12, AF support parts 13 and 14, and the like. AF movable part 11 is disposed in AF fixing part 12 so as to be spaced apart from AF fixing part 12 in a radial direction, and is coupled to AF fixing part 12 by AF support parts 13 and 14.

AF movable part 11 includes AF coil 112 of an AF voice coil motor, and is a part that is moved in the optical-axis direction to focus on a subject. AF fixing part 12 includes driving magnets 122 (AF magnets) of the AF voice coil motor, and is a part that supports AF movable part 11 through AF support parts 13 and 14. That is, a moving coil system is employed in the AF driving part of lens driving device 1.

AF movable part 11 is disposed so as to be spaced apart from AF fixing part 12, and is coupled to AF fixing part 12 by AF support parts 13 and 14. In this embodiment, AF movable part 11 is disposed so as to be spaced apart from AF fixing part 12 in the radial direction. AF support part 13 is an upper elastic support member that is disposed on the light-receiving side (upper side) of AF fixing part 12 in the optical-axis direction and supports AF movable part 11. In this embodiment, AF support part 13 is formed of two leaf springs 131 and 132 (hereinafter, referred to as "upper springs 131 and 132"). AF support part 14 is a lower elastic support member that is disposed on the image formation side (lower side) of AF fixing part 12 in the optical-axis direction and supports AF movable part 11. In this embodiment, AF support part 14 is formed of two leaf springs 141 and 142 (hereinafter, referred to as "lower springs 14"). Further, AF power supply line 17 is disposed at the end portion of AF movable part 11, which faces the light-receiving side in the optical-axis direction, together with AF support part 13 in this embodiment. AF power supply line 17 is formed of two plate-like members 171 and 172 (hereinafter, referred to as "AF power supply lines 171 and 172").

Figure 9A:
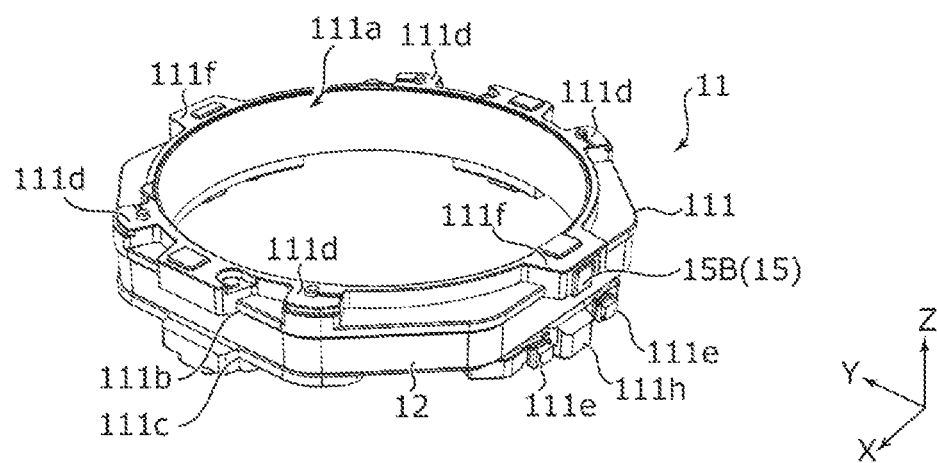
FIGS. 9A and 9B are perspective views of an AF movable part.
Figure 9B:
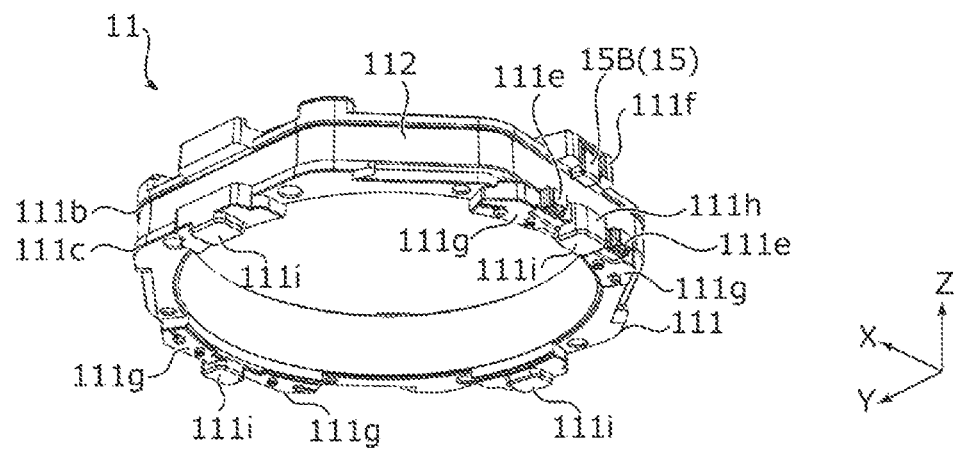

In this embodiment, AF movable part 11 includes lens holder 111, AF coil 112, and position detection magnets 15. The perspective views of AF movable part 11 viewed at a different angle are shown in FIGS. 9A and 9B.

Lens holder 111 is a member that holds lens part 2 (see FIG. 2). Lens holder 111 includes cylindrical lens housing portion 111a and upper flange 111b and lower flange 111c that protrude outward from lens housing portion 111a in the radial direction. That is, lens holder 111 has a bobbin structure. Upper flange 111b and lower flange 111c have a substantially octagonal shape in plan view. The upper surface of upper flange 111b serves as a portion to be locked that is used to regulate the movement of AF movable part 11 to the light-receiving side in the optical-axis direction.

AF coil 112 is wound on a portion (hereinafter, referred to as a "coil-winding portion") interposed between upper flange 111b and lower flange 111c. The coil-winding portion (of which reference numeral is omitted) has the shape of a substantially regular octagon in plan view. Accordingly, a load, which acts on the coil-winding portion in a case where AF coil 112 is directly wound, is uniform and the strength of the coil-winding portion is also substantially uniform around the center. For this reason, the deformation of an opening of lens housing portion 111a can be prevented, so that roundness can be maintained.

Lens part 2 (see FIG. 2) is fixed to lens housing portion 111a by, for example, adhesion. It is preferable that lens housing portion 111a includes a groove (not shown) which is formed on the inner peripheral surface of lens housing portion 111a and to which an adhesive is to be applied. There is a concern that suspension wires 30 supporting OIS movable part 10 may be damaged in a method of mounting lens part 2 on lens housing portion 111a by screwing. In contrast, since lens part 2 is fixed to the inner peripheral surface of lens housing portion 111a by adhesion in this embodiment, damage to suspension wires 30 occurring during the mounting of lens part 2 can be prevented. Further, in a case where the inner peripheral surface of lens housing portion 111a includes a groove, an appropriate amount of an adhesive is held by the groove. Accordingly, adhesion strength between lens holder 111 and lens part 2 is improved.

Lens holder 111 includes upper spring-fixing portions 111d that are provided at the outer peripheral edge of an upper portion of lens housing portion 111a and are used to fix AF support part 13. Further, lens holder 111 includes lower spring-fixing portions 111g that are provided on the lower surface of lower flange 111c and are used to fix AF support part 14.

Lens holder 111 includes magnet housing portions 111f that are provided at the outer peripheral edge of the upper portion of lens housing portion 111a and house position detection magnets 15 (15A and 15B). In this embodiment, two magnet housing portions 111f are provided so as to face each other in the Y direction. In addition, magnet housing portions 111f are provided at positions that correspond to the middle of a portion between magnets 122A and 122B adjacent to each other in the X direction and the middle of a portion between magnets 122C and 122D. Magnet housing portions 111f may be provided at the outer peripheral edge of a lower portion of lens housing portion 111a (a part of lower flange 111c).

Lens holder 111 includes tying portions 111e that are provided on a part of lower flange 111c and protrude outward in the radial direction (see FIGS. 9A and 9B). End portions of AF coil 112 are tied to tying portions 111e, respectively. Further, protruding portion 111h, which protrudes in the radial direction, is provided on lens holder 111 between the two tying portions 111e. Since both ends of AF coil 112 tied to tying portions 111e are spatially separated from each other by protruding portion 111h and insulation is ensured, safety and reliability are improved.

Furthermore, lens holder 111 includes holder-side contact portions 111i that are provided on the lower surface thereof and protrude toward the image formation side in the optical-axis direction more than portions positioned around holder-side contact portions 111i. Holder-side contact portions 111i serve as a portion to be locked that is used to regulate the movement of AF movable part 11 to the image formation side in the optical-axis direction. In this embodiment, four holder-side contact portions 111i are provided so as to face each other in the X direction and the Y direction. Holder-side contact portions 111i come into contact with the upper surface of coil base plate 22 (see FIGS. 19 and 20) of OIS fixing part 20.

In this embodiment, lens holder 111 is made of a molding material that is formed of polyarylate (PAR) or a PAR alloy where a plurality of resin materials including PAR are mixed. Particularly, it is preferable that the PAR alloy is a polymer alloy (PAR/PC) consisting of PAR and polycarbonate (PC). Accordingly, since weld strength is higher than that of a molding material in the related art (for example, liquid crystal polymer (LCP)), toughness and impact resistance can be ensured even though the thickness of lens holder 111 is reduced. Therefore, the external size of lens driving device 1 can be reduced, so that the size and weight of lens driving device 1 can be reduced. Lens holder 111 may be made of a liquid crystal polymer or the like.

Further, it is preferable that lens holder 111 is formed by multiple-gate injection molding. In this case, it is preferable that the diameter of the gate is 0.3 mm or more. Accordingly, since fluidity during molding is improved, thin-wall molding can be performed and the generation of a sink mark can be prevented even in a case where PAR or a PAR alloy is used as a molding material.

The molding material formed of PAR or a PAR alloy has electrical conductivity and it is particularly preferable that the volume resistivity of the molding material is in the range of $10^9$ to $10^{11}$ $\Omega \cdot cm$. For example, it is possible to easily give electrical conductivity to the molding material by mixing carbon nanotubes into existing PAR or an existing PAR alloy. In this case, it is possible to give appropriate electrical conductivity to the molding material by adjusting the carbon nanotube content of the molding material. Accordingly, since the charging of lens holder 111 can be suppressed, the generation of static electricity can be prevented.

Further, it is preferable that the molding material formed of PAR or a PAR alloy contains fluorine. Accordingly, since an intermolecular force is reduced, an attractive force of a portion (holder-side contact portion 111i), which comes into contact with coil base plate 22, is reduced and the slidability of lens holder 111 is improved. Therefore, the generation of dust, which is caused by friction in a case where lens holder 111 and coil base plate 22 come into contact with each other, can be prevented.

In a case where lens holder 111 is formed so as to have the above-mentioned structure in this way, the size and weight of lens driving device 1 can be reduced and the reliability of lens driving device 1 can be improved.

AF coil 112 is an air-core coil in which current flows during focusing, and is wound on the outer peripheral surface of the coil-winding portion (of which reference numeral is omitted) of lens holder 111. Both ends of AF coil 112 are tied to tying portions 111e of lens holder 111, respectively. Current flows in AF coil 112 through AF support part 14 (lower springs 141 and 142). The current flowing in AF coil 112 is controlled by AF control part 16 (control IC 161, see FIG. 16).

Figure 10:
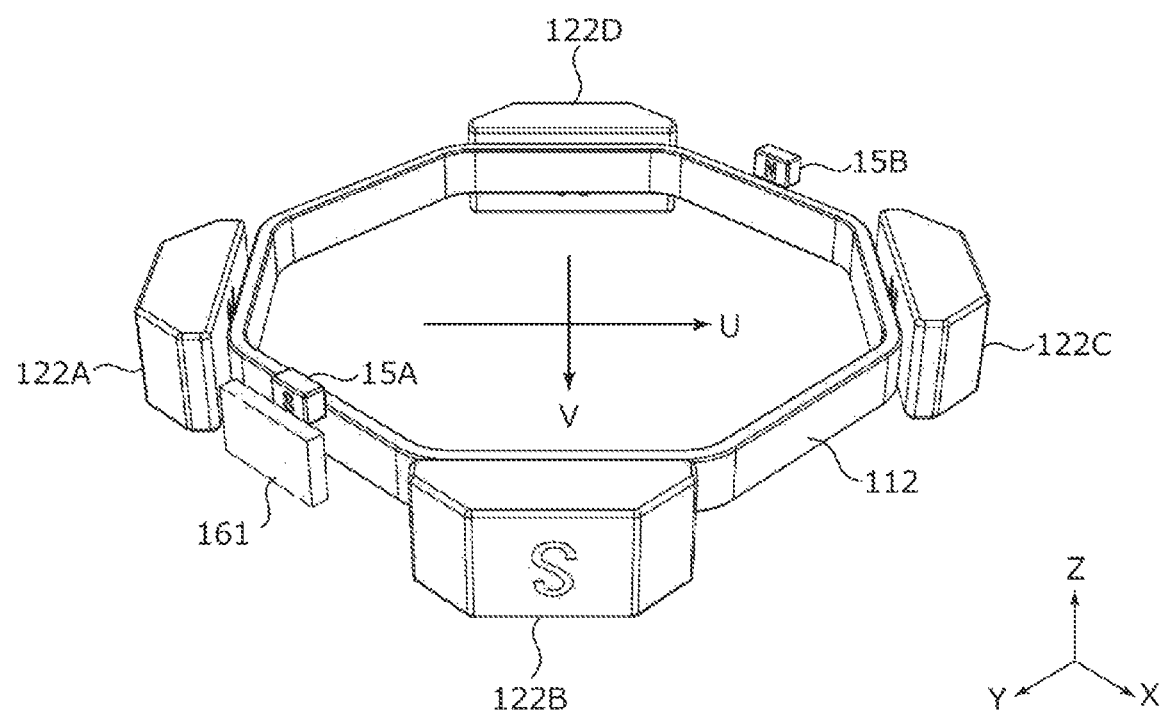
FIG. 10 is a perspective view showing the arrangement of position detection magnets.
Figure 11:
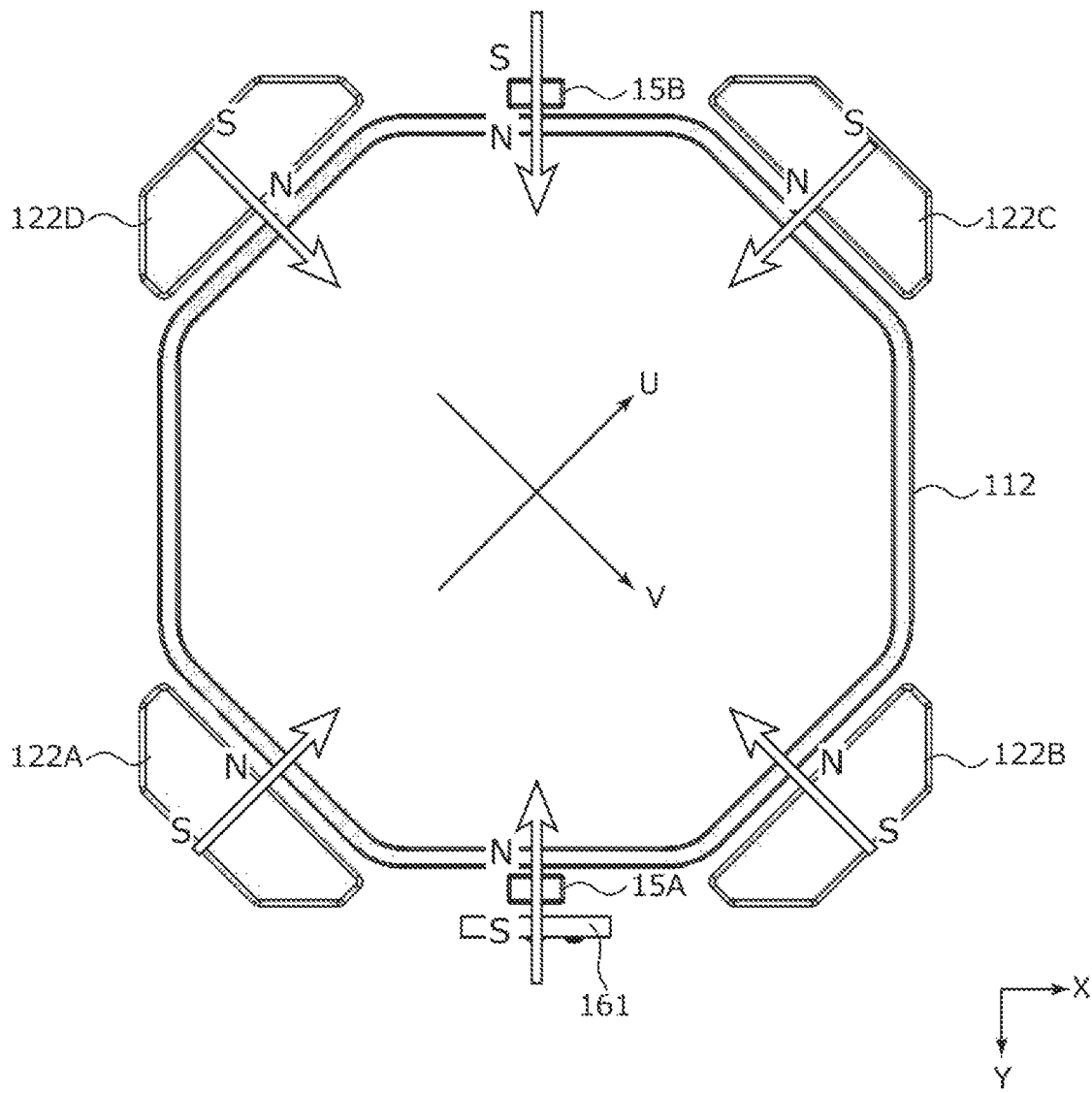
FIG. 11 is a plan view showing the arrangement of the position detection magnets.

Position detection magnets 15 are disposed in magnet housing portions 111f of lens holder 111. The disposition of the position detection magnets is shown in FIGS. 10 and 11. That is, position detection magnets 15 are disposed at positions that correspond to the middle of a portion between magnets 122A and 122B and the middle of a portion between magnets 122C and 122D. Position detection magnets 15 include first position detection magnet 15A that is disposed in magnet housing portion 111f positioned on a side corresponding to AF control part 16, and second position detection magnet 15B that is disposed in magnet housing portions 111f positioned on the opposite side. First position detection magnet 15A is used to detect the position of AF movable part 11 in the optical-axis direction. Second position detection magnet 15B is a dummy magnet that is not used to detect the position of AF movable part 11.

Second position detection magnet 15B is disposed to stabilize the attitude of AF movable part 11 by making magnetic forces, which act on AF movable part 11, be in balance. That is, in a case where second position detection magnet 15B is not disposed, a one-sided magnetic force acts on AF movable part 11 due to magnetic fields generated by driving magnets 122 and the attitude of AF movable part 11 becomes unstable. For this reason, second position detection magnet 15B is disposed to prevent the attitude of AF movable part 11 from becoming unstable.

In this embodiment, first position detection magnet 15A and second position detection magnet 15B are magnetized in the radial direction as with driving magnets 122 and the magnetization directions thereof are also the same as those of driving magnets 122. Specifically, the inner peripheral side of each of first and second position detection magnets 15A and 15B is magnetized to an N pole and the outer peripheral side thereof is magnetized to an S pole.

It is preferable that the width of each of first and second position detection magnets 15A and 15B in the optical-axis-orthogonal direction (here, the width of each of first and second position detection magnets 15A and 15B in the Y direction) is equal to or smaller than the height thereof in the optical-axis direction. Accordingly, it is possible to reduce the thickness of lens holder 111 while ensuring the density of magnetic flux emitted from first and second position detection magnets 15A and 15B. The detailed disposition of first and second position detection magnets 15A and 15B (a positional relationship between AF control part 16 and first and second position detection magnets 15A and 15B) will be described later.

Figure 12A:
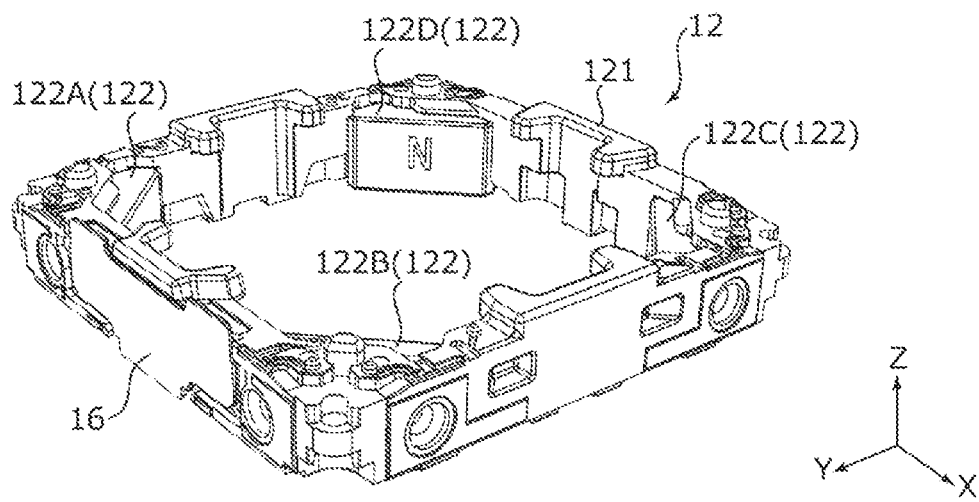
FIGS. 12A and 12B are perspective views of an AF fixing part.
Figure 12B:
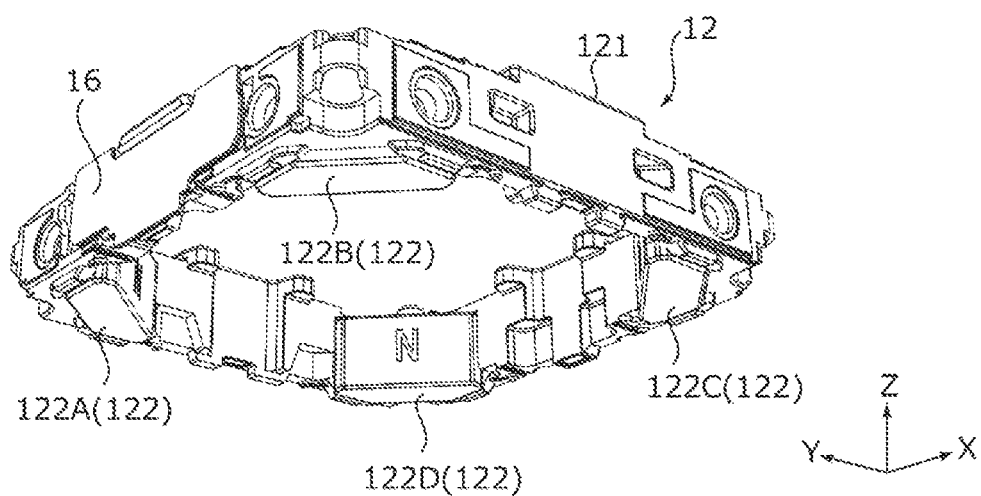

In this embodiment, AF fixing part 12 includes magnet holder 121, driving magnets 122, and AF control part 16. AF fixing part 12, which is in a state where driving magnets 122 and AF control part 16 are assembled with magnet holder 121, is shown in FIGS. 12A and 12B.

Magnet holder 121 is a substantially rectangular cylindrical holding member that includes four side walls 121b coupled to each other. Magnet holder 121 includes opening 121a at which portions of magnet holder 121 corresponding to lens housing portion 111a, upper spring-fixing portions 111d, and magnet housing portions 111f of lens holder 111 are cut out.

Magnet holder 121 includes magnet holding portions 121c that are formed on inner portions of coupling portions between four side walls 121b (four corners of magnet holder 121) and hold driving magnets 122. The inner surface of each magnet holding portion 121c serves as each of adhesion surfaces to which driving magnets 122 adhere. The adhesion surface of each magnet holding portion 121c is parallel to the optical-axis direction, and an end portion thereof facing the image formation side in the optical-axis direction (an end portion thereof facing OIS fixing part 20 in the optical-axis direction, a first end portion) is opened. The reason for this is that it is magnetically preferable that nothing is disposed between each driving magnet 122 and each OIS coil 221 (see FIG. 19), which is disposed on OIS fixing part 20, since driving magnets 122 are also used as the OIS magnets. That is, driving magnet 122 is fixed by only the adhesion of an adhesive without being fixed not to be physically separated due to the shape of magnet holding portion 121c.

Suspension wires 30 are arranged on outer portions 121d of the coupling portions between side walls 121b (hereinafter, referred to as "wire insertion portions 121d"). In this embodiment, a recessed portion (of which reference numeral is omitted), which is recessed inward in the radial direction so as to have the shape of an arc, is formed at each of upper and lower portions of the coupling portions between side walls 121b. Further, a through-hole (of which reference numeral is omitted) is formed at the middle portion of each of the coupling portions between side walls 121b in the optical-axis direction. The through-hole and the upper and lower recessed portions, which are provided at each of the coupling portions between side walls 121b, form each wire insertion portion 121d. The sizes of the through-hole and the upper and lower recessed portions are set larger than the movable range of OIS movable part 10 in the optical-axis-orthogonal plane. Since each wire insertion portion 121d has the above-mentioned structure, it is possible to avoid interference between each suspension wire 30 and magnet holder 121 during the swaying of OIS movable part 10 without an increase in the external size of lens driving device 1.

Magnet holder 121 includes stopper portions 121e that are provided at the upper portions of side walls 121b and protrude inward in the radial direction. In a case where AF movable part 11 is moved to the light-receiving side in the optical-axis direction, the movement of AF movable part 11 to the light-receiving side in the optical-axis direction is regulated by the contact between stopper portions 121e and upper flange 111b of lens holder 111. In this embodiment, stopper portions 121e are provided at four positions that face each other in the X direction and the Y direction.

Magnet holder 121 includes upper spring-fixing portions 121f that are provided on the upper surfaces of side walls 121b and are used to fix AF support part 13 and AF power supply line 17. Magnet holder 121 includes lower spring-fixing portions 121g that are provided on the lower surfaces of side walls 121b and are used to fix AF support part 14. Further, magnet holder 121 includes protruding portions 121i that are provided on the lower surfaces of side walls 121b, which extend in the X direction, at middle portions of side walls 121b in a longitudinal direction. Lower springs 141 and 142 of AF support part 14 are spatially separated from each other by protruding portions 121i. That is, one protruding portion 121i is positioned between terminal connection portions 141h and 142h of lower springs 141 and 142 (see FIG. 18), and is positioned between power output terminals 162a and 162b (see FIG. 16) in a state where AF control part 16 is mounted. Since terminal connection portions 141h and 142h (power output terminals 162a and 162b) of lower springs 141 and 142 are spatially separated from each other by protruding portion 121i and insulation is ensured, safety and reliability are improved.

Corners of upper spring-fixing portions 121f are formed to be recessed toward the image formation side in the optical-axis direction more than the upper surface of magnet holder 121 (the surface of magnet holder 121 on which AF support part 13 or AF power supply line 17 are to be mounted), and are adapted so that gaps are formed in a case where AF support part 13 or AF power supply line 17 are mounted. Further, magnet holder 121 includes IC housing portion 121h that is provided on one side wall 121b extending in the X direction and houses AF control part 16.

In this embodiment, magnet holder 121 is made of a liquid crystal polymer. Magnet holder 121 may be made of a molding material formed of PAR or a PAR alloy as with lens holder 111, but it is preferable that magnet holder 121 is made of a liquid crystal polymer excellent in heat resistance. Since magnet holder 121 has high heat resistance, the soldering of AF support parts 13 and 14, AF control part 16, and the like can be easily performed. Magnet holder 121 is formed by, for example, injection molding using a mold.

In this embodiment, driving magnets 122 are formed of four magnets 122A to 122D having the shape of a rectangular column. Magnets 122A to 122D have the shape of a substantially isosceles trapezoid in plan view. Accordingly, spaces (magnet holding portions 121c) provided at the corners of magnet holder 121 can be effectively used. Magnets 122A to 122D are magnetized so that magnetic fields crossing AF coil 112 in the radial direction are formed. In this embodiment, the inner peripheral side of each of magnets 122A to 122D is magnetized to an N pole and the outer peripheral side thereof is magnetized to an S pole. Further, the surface of each driving magnet 122 is covered with a metal film, such as Ni plating, so that the corrosion resistance of the surface of each driving magnet 122 is improved.

In this embodiment, magnets 122A to 122D are fixed to magnet holding portions 121c of magnet holder 121 by adhesion. For example, an epoxy resin-based thermosetting adhesive or an epoxy resin-based ultraviolet-curable adhesive is used as the adhesive. The surfaces of each of magnets 122A to 122D, which are to be in contact with magnet holding portion 121c, (in this embodiment, the side surfaces and the upper surface of each magnet except for the surface of each magnet exposed to the inside) serves as adhesion surfaces.

The lower surfaces of magnets 122A to 122D protrude toward the image formation side in the optical-axis direction more than magnet holder 121 (see FIG. 6). That is, the height of OIS movable part 10 is defined by magnets 122A to 122D. Accordingly, the height of OIS movable part 10 can be minimized according to the sizes of magnets 122A to 122D that are used to ensure magnetic forces, so that the height of lens driving device 1 can be reduced.

Driving magnets 122 and AF coil 112 form the AF voice coil motor. In this embodiment, driving magnets 122 are also used as the AF magnets and the OIS magnets. Yokes may be provided on the peripheral surfaces of magnets 122A to 122D.

Here, since adhesion strength between magnet holder 121 and each driving magnet 122, which is obtained in a case where magnet holder 121 is made of a liquid crystal polymer, is lower than that obtained in a case where magnet holder 121 is made of PAR or the like, AF fixing part 12 is weak against an impact caused by falling or the like. In this embodiment, the structure of the adhesion surface of each magnet holding portion 121c of magnet holder 121 is devised for the improvement of impact resistance.

Figure 13A:
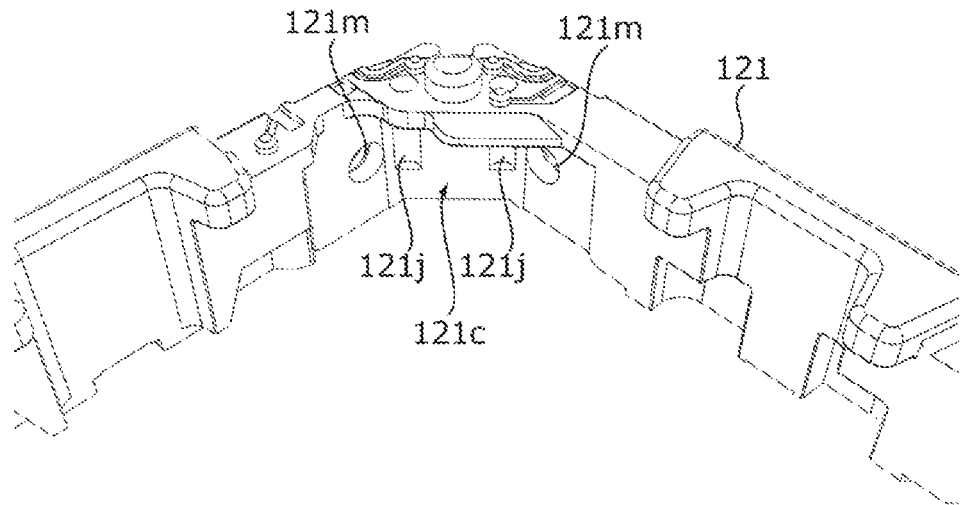
FIGS. 13A and 13B are perspective views showing the structure of a magnet holding portion.
Figure 13B:
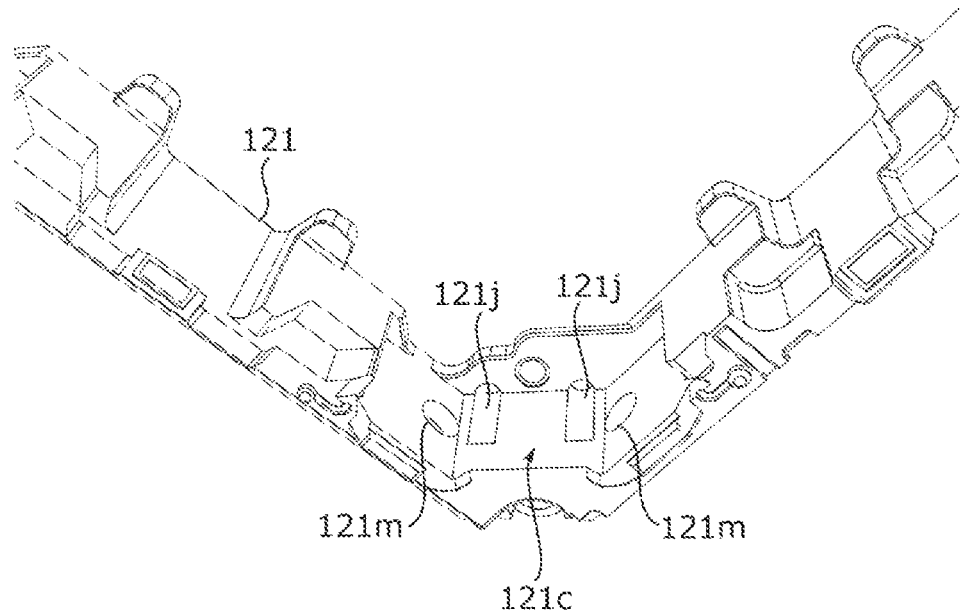

The detailed structure of each magnet holding portion 121c is shown in FIGS. 13A and 13B. As shown in FIGS. 13A and 13B, in this embodiment, an adhesion surface of magnet holder 121 to which driving magnet 122 adheres (the adhesion surface of magnet holding portion 121c) includes recessed portions 121j that extend in the optical-axis direction. Specifically, recessed portions 121j are formed so as to extend toward the upper end portion of magnet holder 121 from a portion positioned above the lower end portion of magnet holder 121, that is, toward an end portion (second end portion) of the adhesion surface facing the light-receiving side in the optical-axis direction from a portion positioned closer to the inside than an end portion (first end portion) of the adhesion surface facing the image formation side in the optical-axis direction. Accordingly, a difference in level is formed on the adhesion surface of magnet holder 121 to which driving magnet 122 adheres (see FIG. 14A).

Figure 14A:
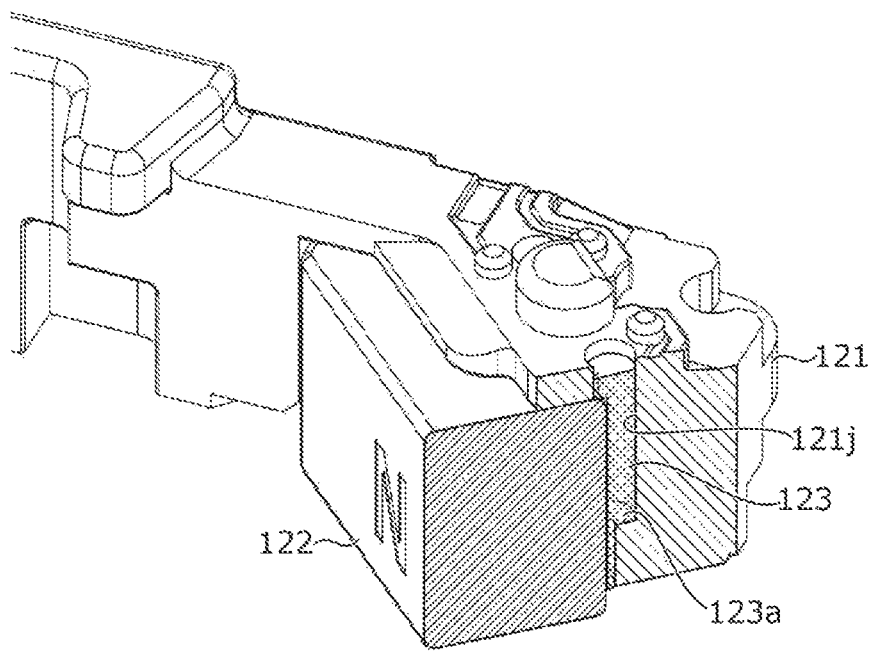
FIGS. 14A and 14B are cross-sectional views showing the contact structure of the magnet.
Figure 14B:
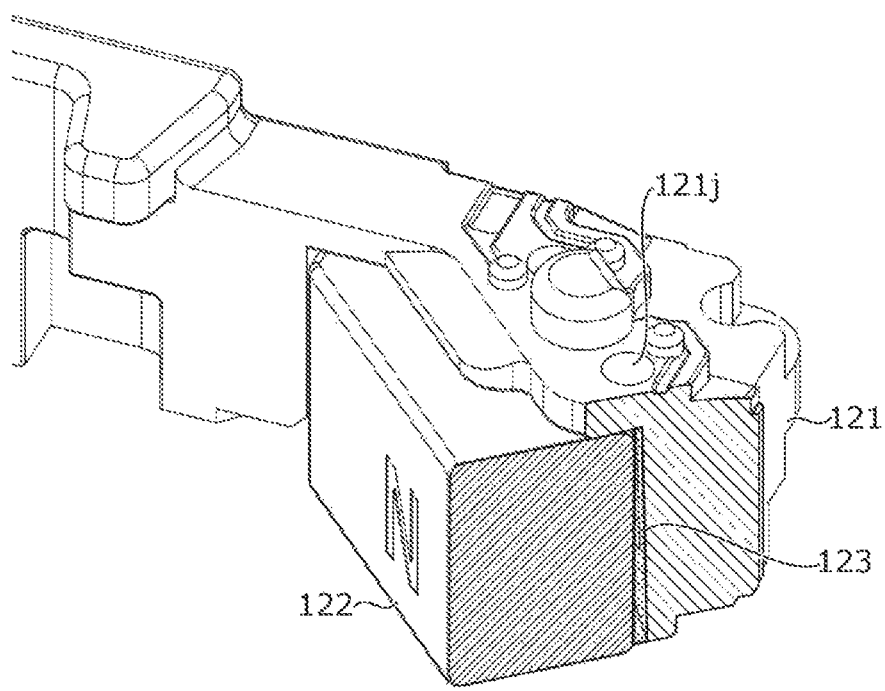

FIG. 14A is a cross-sectional view of adhesive layer 123 in recessed portion 121j, and FIG. 14B is a cross-sectional view of adhesive layer 123 on the adhesion surface other than recessed portion 121j. Since the metal film (for example, Ni plating) provided on the surface of each driving magnet 122 is an active surface, adhesion strength between driving magnet 122 and an epoxy adhesive is high. On the other hand, adhesion strength between magnet holder 121, which is made of a liquid crystal polymer, and an epoxy adhesive is low. For this reason, if the entire adhesion surface of magnet holder 121 to which driving magnet 122 adheres is flat as shown in FIG. 14B, magnet holder 121 is easily separated from the adhesive layer and AF fixing part 12 is weak against an impact.

In contrast, as shown in FIG. 14A, in this embodiment, adhesive layer 123 is three-dimensionally formed so as to partially include stepped portion 123a (see FIG. 14A) inside magnet holder 121. Accordingly, stepped portion 123a of adhesive layer 123, which is firmly adhered to driving magnet 122, is physically locked to magnet holder 121. Accordingly, since a high anchoring effect can be obtained, desired adhesion strength can be ensured even though magnet holder 121 is made of a liquid crystal polymer having low adhesiveness. As a result, the impact resistance of lens driving device 1 can be improved, and the reliability of lens driving device 1 can be eventually improved.

Since an adhesive area could be sufficiently ensured as in the related art in a case where limitations on the height and external shape of the lens driving device were loosened, specifications withstanding a falling test could be achieved even though the driving magnets were fixed to the magnet holder by adhesion. However, since the heights of the driving magnets and the magnet holder have been limited to meet a demand for a reduction in height, or the like in recent years, it has been difficult to ensure a sufficient adhesive area and there has also been a demand for the improvement of impact resistance. Lens driving device 1 of this embodiment can also meet these demands Actually, it is confirmed that the impact resistance of lens driving device 1 of this embodiment is 1.5 or more times the impact resistance of a lens driving device in a case where the entire adhesion surface of magnet holder 121 to which each driving magnet 122 adheres is flat.

Here, recessed portions 121j can be formed of pins that are arranged in the form of a structure to be inserted into, for example, a mold body. For this reason, recessed portions 121j pass through the upper surface of magnet holder 121. It is difficult to form a shape like recessed portion 121j by a mold having a simple structure, but it is possible to relatively easily form recessed portion 121j by using an insert pin.

Each recessed portion 121j has a semicircular cross-section in this embodiment. The cross-sectional shape of recessed portion 121j may not be a semicircular shape. Further, two recessed portions 121j are formed on one adhesion surface in this embodiment.

Accordingly, adhesion strength can be further improved. The number of recessed portions 121j to be formed on one adhesion surface is not particularly limited, and may be one or three or more.

In this embodiment, magnet holder 121 further includes adhesive injection holes 121m that communicate with the adhesion surfaces in the radial direction. Adhesive injection holes 121m are arranged near recessed portions 121j. An adhesive is injected from adhesive injection holes 121m in a state where driving magnets 122 are mounted on magnet holder 121. After the injected adhesive is cured to adhere driving magnets 122 to magnet holder 121, an adhesive is further injected to close adhesive injection holes 121m. Adhesive layer 123 is formed so as to include stepped portions even at portions of adhesive injection holes 121m. Accordingly, since an anchoring effect is further improved, adhesion strength between magnet holder 121 and each driving magnet 122 is further improved.

Further, it is preferable that embossing may be performed on each of the adhesion surfaces of magnet holder 121 to which driving magnets 122 adhere. Accordingly, since an adhesive area is increased and an anchoring effect is also further increased, adhesion strength between magnet holder 121 and each driving magnet 122 is further improved.

Figure 16:
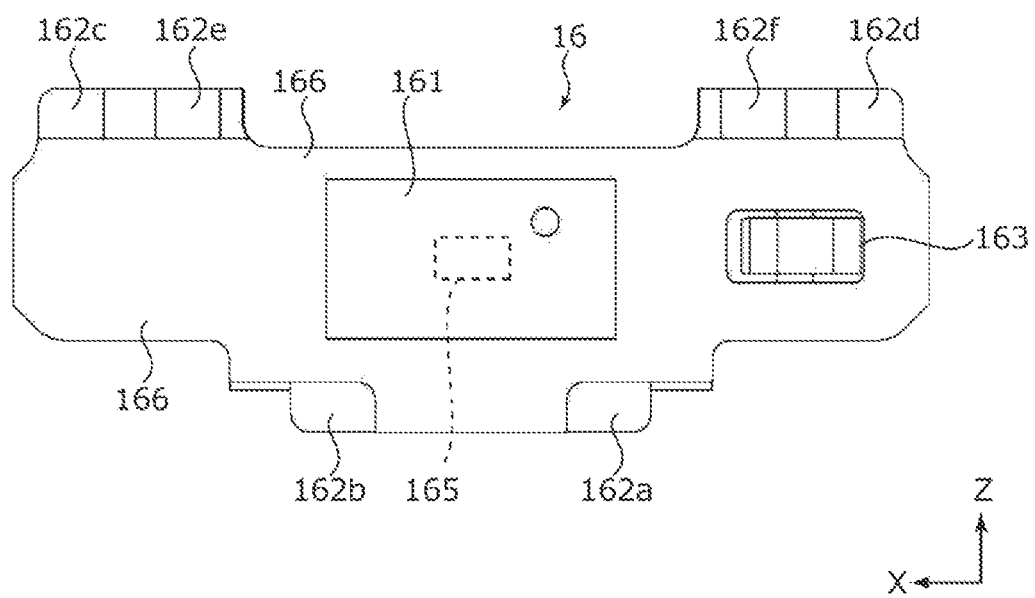
FIG. 16 is a diagram showing the configuration of an AF control part.

AF control part 16 of AF fixing part 12 includes control IC 161, bypass capacitor 163, and AF printed circuit board 166 on which control IC 161 and bypass capacitor 163 are mounted (see FIG. 16). AF control part 16 is fixed to IC housing portion 121h of magnet holder 121 by, for example, adhesion. In this case, control IC 161 and bypass capacitor 163 are fitted into an opening (of which reference numeral is omitted) of IC housing portion 121h.

Hall element 165, which detects a change in a magnetic field by using Hall effect, is built in control IC 161, and control IC 161 functions as a Z-position detection part. In a case where AF movable part 11 is moved in the optical-axis direction, a magnetic field generated by first position detection magnet 15A is changed. In a case where hall element 165 detects a change in this magnetic field, the position of AF movable part 11 in the optical-axis direction is detected. In a case where the layouts of hall element 165 and position detection magnets 15 are designed so that magnetic flux proportional to the moving distance of AF movable part 11 crosses the detection surface of hall element 165, a hall output proportional to the moving distance of AF movable part 11 can be obtained.

Figure 15A:
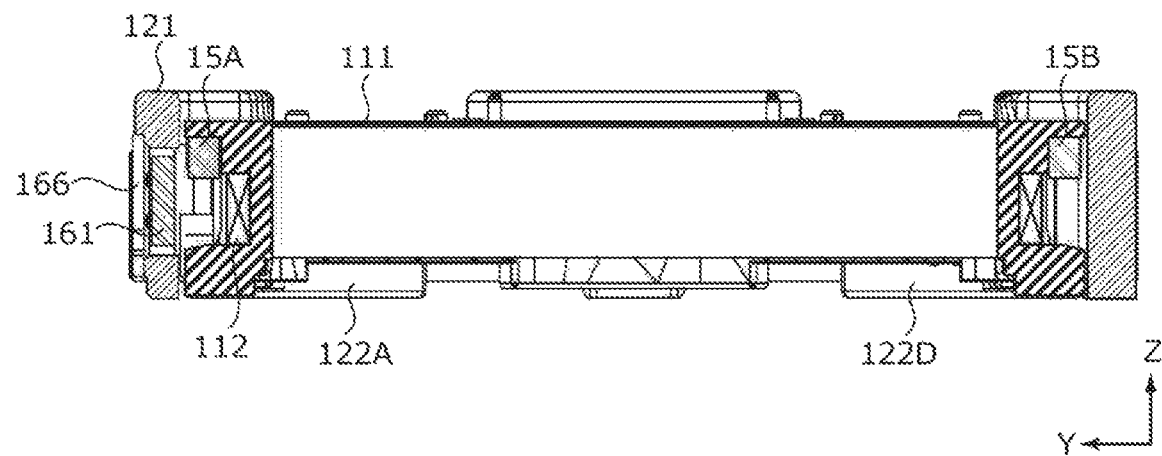
FIGS. 15A and 15B are cross-sectional views taken along a YZ plane passing through the first position detection magnet.
Figure 15B:
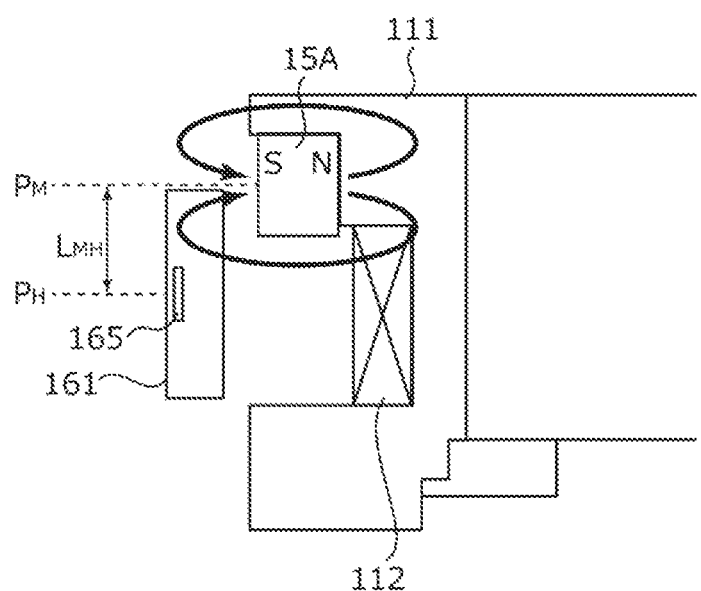

As shown in FIGS. 15A and 15B, control IC 161 is disposed to face first position detection magnet 15A so that the magnetic flux of first position detection magnet 15A crosses the detection surface of hall element 165 in the radial direction. FIG. 15B schematically enlarges and shows a portion near first position detection magnet 15A. In this embodiment, the detection surface of hall element 165 is parallel to an XZ plane.

As described above, first and second position detection magnets 15A and 15B are magnetized in the radial direction as with magnets 122A to 122D. In a case where position detection magnets 15 are disposed so as to allow the magnetization directions of position detection magnets 15 to be parallel to the optical-axis direction and the layouts of hall element 165 and position detection magnets 15 are set so as to allow that zero cross (zero magnetic field) to occur at a neutral point (a point where AF movable part 11 is magnetically stable in a state where current does not flow in AF coil 112), a magnetic force in the optical-axis direction acts on position detection magnets 15 due to the influence of magnetism caused by driving magnets 122. For this reason, there is a concern that the neutral point of AF movable part 11 may be changed from a design position.

In contrast, since position detection magnets 15 are magnetized in the radial direction in this embodiment, the magnetic force in the optical-axis direction acting on position detection magnets 15 is reduced due to the influence of magnetism caused by driving magnets 122. Accordingly, since the change of the neutral point of AF movable part 11 can be suppressed, the accuracy of detection of the position of AF movable part 11 in the optical-axis direction is improved and reliability is improved.

Further, since the magnetization direction of first position detection magnet 15A is perpendicular to the detection surface of hall element 165, density of magnetic flux crossing the detection surface is high and a hall output, which is larger than a hall output obtained in a case where the magnetization direction is parallel to the detection surface, can be obtained. Furthermore, since the magnetization direction of first position detection magnet 15A is the same as the magnetization direction of driving magnet 122, the magnetic flux of first position detection magnet 15A crossing the detection surface of hall element 165 is not offset by the magnetic flux of driving magnet 122. Accordingly, since the size of each position detection magnet 15 can be reduced, the size and weight of lens driving device 1 can be reduced.

In addition, first position detection magnet 15A is disposed closer to hall element 165 than AF coil 112 in the radial direction. In other words, first position detection magnet 15A is disposed between hall element 165 and AF coil 112 in the radial direction. Accordingly, since it is difficult for hall element 165 to be affected by AF coil 112, the accuracy of detection of a position is improved.

There is a concern that the linearity of a hall output n the case of this embodiment may be lower than that in a case where the magnetization direction of position detection magnet 15 is made parallel to the optical-axis direction and the position of zero cross is set as a neutral point. For this reason, it is preferable that control IC 161 has a function to correct linearity. Accordingly, since the linearity of a hall output can be ensured, the accuracy of detection of the position of AF movable part 11 in the optical-axis direction is improved.

Further, first position detection magnet 15A is disposed to be shifted from hall element 165 in the optical-axis direction. In this embodiment, first position detection magnet 15A is disposed to be shifted from hall element 165 to the light-receiving side in the optical-axis direction. That is, central position $P_M$ of first position detection magnet 15A in the optical-axis direction is shifted from central position $P_H$ of hall element 165 to the light-receiving side in the optical-axis direction (see FIG. 15B).

In this case, it is preferable that first position detection magnet 15A is disposed so that central position $P_M$ of first position detection magnet 15A is closer to the light-receiving side than central position $P_H$ of hall element 165 in the optical-axis direction in a case where AF movable part 11 is moved to be closest to the image formation side in the optical-axis direction. That is, it is preferable that a distance $L_{MH}$ between the center of first position detection magnet 15A and the center of hall element 165 in the optical-axis direction is longer than the movement stroke of AF movable part 11 to the image formation side in the optical-axis direction (hereinafter, referred to as a "lower stroke"). In other words, it is preferable that a shift between first position detection magnet 15A and hall element 165 in the optical-axis direction is larger than the stroke of AF movable part 11 to a side opposite to a side to which first position detection magnet 15A is shifted.

In this embodiment, the distance $L_{MH}$ between the center of first position detection magnet 15A and the center of hall element 165 in the optical-axis direction is two or more times the lower stroke. Accordingly, since magnetic flux crossing the detection surface of hall element 165 monotonically increases or decreases with an autofocus operation, the position of AF movable part 11 in the optical-axis direction can be easily and accurately calculated on the basis of a hall output.

Position detection magnet 15 may be disposed so as to be shifted from hall element 165 to the image formation side in the optical-axis direction. In this case, it is preferable that a distance $L_{MH}$ between the center of first position detection magnet 15A and the center of hall element 165 in the optical-axis direction is longer than the movement stroke of AF movable part 11 to the light-receiving side in the optical-axis direction (hereinafter, referred to as an "upper stroke").

In a case where hall element 165 and position detection magnet 15 are formed so as to have the above-mentioned configuration in this way, the size and weight of lens driving device 1 can be reduced and the reliability of lens driving device 1 can be improved.

FIG. 16 is a diagram showing the configuration of AF control part 16. FIG. 16 shows the side surface of AF control part 16 from a proximal end side in the Y direction.

As shown in FIG. 16, AF printed circuit board 166 includes a conductor pattern that includes power output terminals 162a and 162b, power input terminals 162c and 162d, signal input terminals 162e and 162f, and wiring (not shown). The wiring is formed on, for example, the surface and back of AF printed circuit board 166. The wiring formed on the surface and the wiring formed on the back of a base material are connected to each other through through-holes (not shown). The surface and back of AF printed circuit board 166 are covered with a resist film (of which reference numeral is omitted), and respective terminals 162a to 162f are exposed from the resist film.

Figure 17:
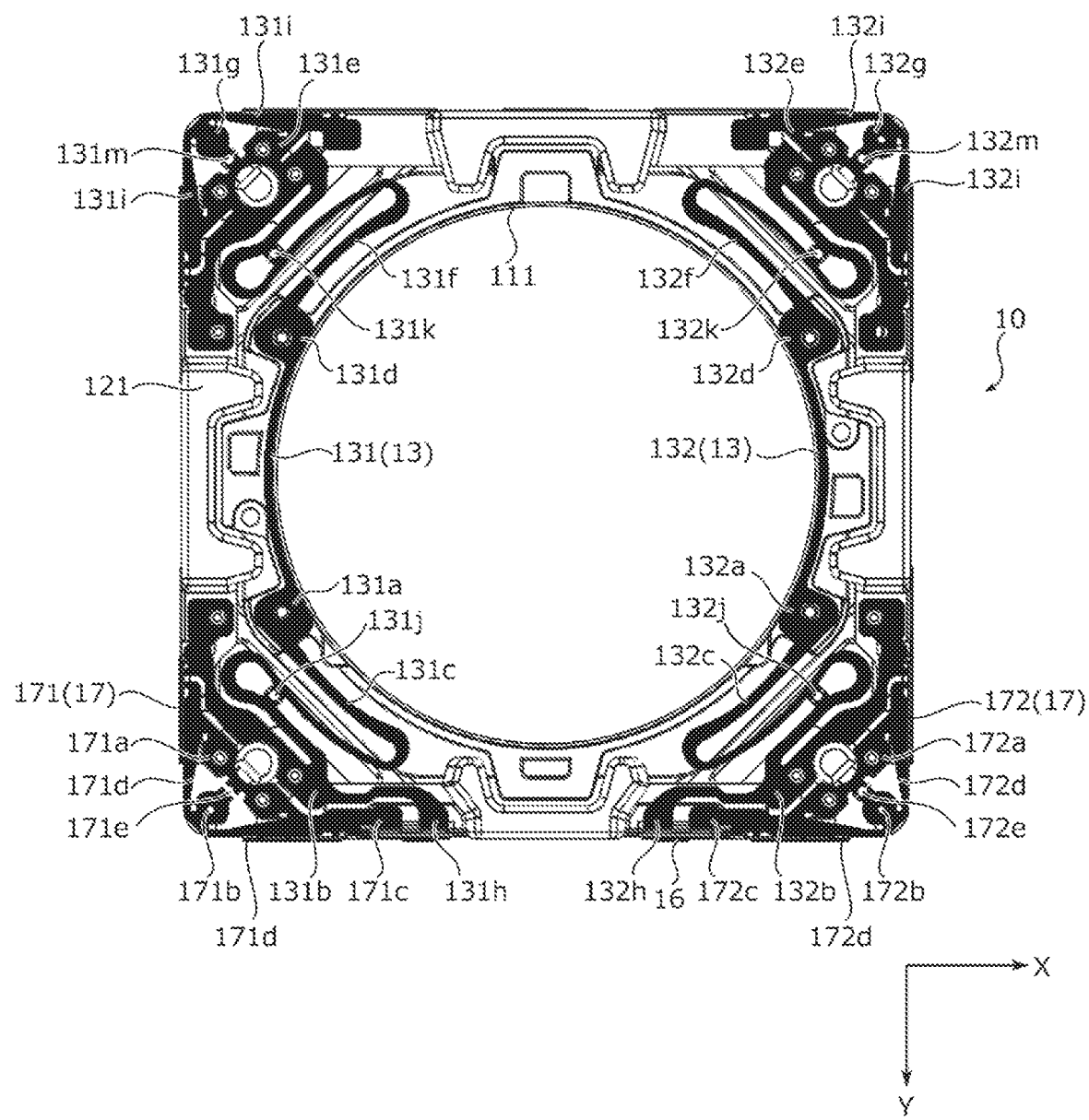
FIG. 17 is a plan view showing the configuration of an upper elastic support part and an AF power supply line.
Figure 18:
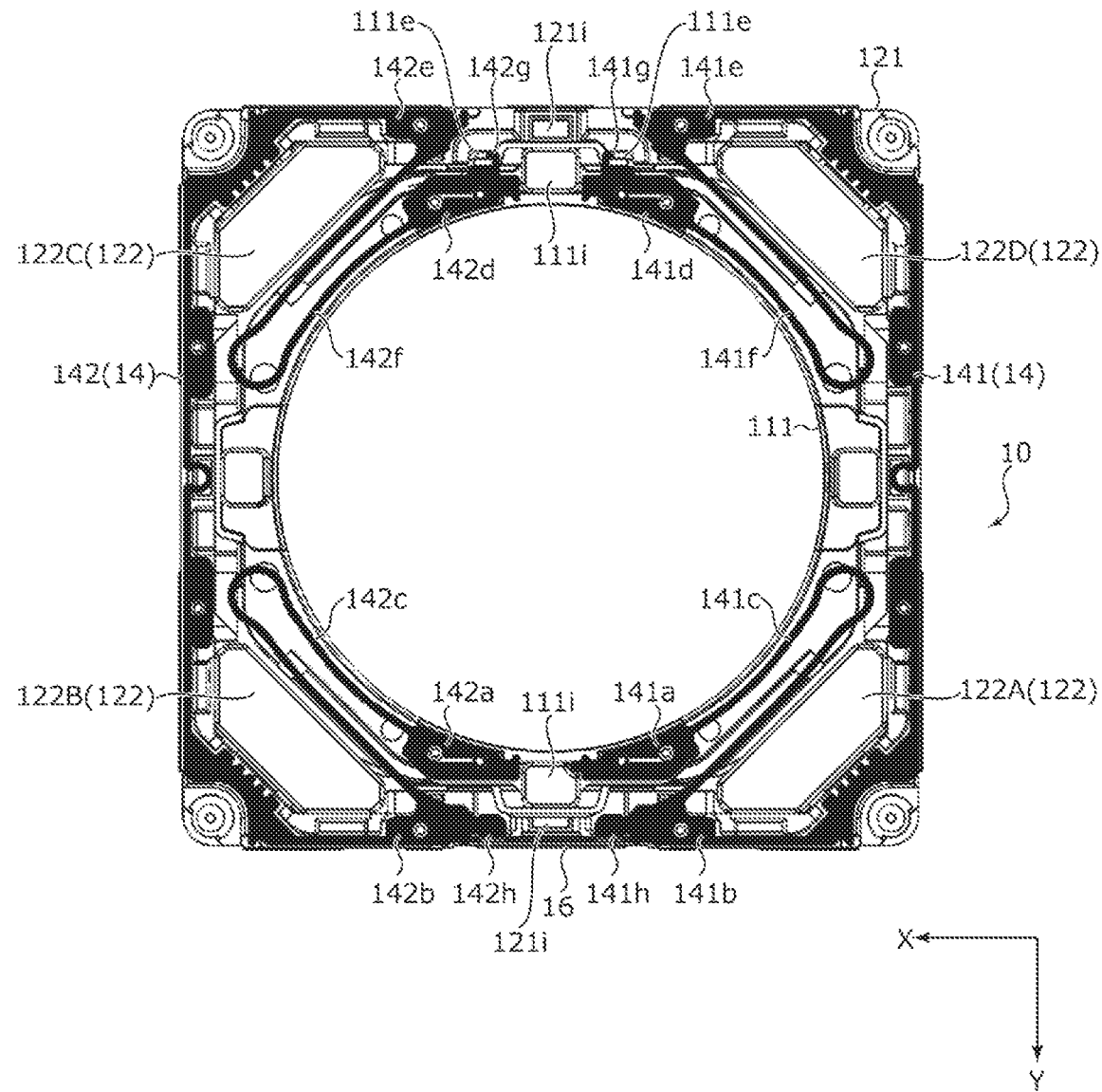
FIG. 18 is a diagram showing the configuration of a lower elastic support part.

Power output terminals 162a and 162b are electrically connected to AF support part 14 (terminal connection portions 141h and 142h of lower springs 141 and 142, see FIG. 18). Power input terminals 162c and 162d are electrically connected to AF power supply line 17 (terminal connection portions 171c and 172c of AF power supply lines 171 and 172, see FIG. 17). Signal input terminals 162e and 162f are electrically connected to AF support part 13 (terminal connection portions 131h and 132h of upper springs 131 and 132, see FIG. 17). Respective terminals 162a to 162f are electrically connected to control IC 161 through the wiring. Bypass capacitor 163 bypasses a power supply line and a GND line of the wiring, and suppresses a change in a power supply voltage.

Control IC 161 functions as a coil control part that controls current flowing in AF coil 112. Specifically, control IC 161 controls current, which flows in AF coil 112, on the basis of control signals supplied through signal suspension wires 31A and 31B and AF support part 13 (AF signal lines) and a detection result (hall output) of hall element 165 built in control IC 161.

As shown in FIGS. 7 and 8, AF support part 13 (upper springs 131 and 132) of AF movable part 11 is disposed on the light-receiving side in the optical-axis direction and elastically supports AF movable part 11 (lens holder 111) with respect to AF fixing part 12 (magnet holder 121). The configuration of upper springs 131 and 132 and AF power supply lines 171 and 172 is shown in FIG. 17. FIG. 17 is a plan view of OIS movable part 10. Upper springs 131 and 132 and AF power supply lines 171 and 172 are made of, for example, titanium copper, nickel copper, stainless steel, or the like.

As shown in FIG. 17, each of upper springs 131 and 132 and AF power supply lines 171 and 172 has a rectangular shape in plan view as a whole, that is, the same shape as magnet holder 121. Upper springs 131 and 132 and AF power supply lines 171 and 172 are disposed on magnet holder 121 not to be in contact with each other. Upper springs 131 and 132 and AF power supply lines 171 and 172 are formed by the etching of, for example, a piece of sheet metal.

Upper springs 131 and 132 and AF power supply lines 171 and 172 are fixed to four corners of magnet holder 121. Current, which is larger than current flowing in upper springs 131 and 132 functioning as the AF signal lines, flows in AF power supply lines 171 and 172. For this reason, AF power supply lines 171 and 172 are disposed closer to AF control part 16 than upper springs 131 and 132, so that the length of the line is shortened. Accordingly, the risk of the short-circuit of a power supply can be reduced.

Upper spring 131 includes lens holder-fixing portions 131a and 131d that are fixed to lens holder 111, magnet holder-fixing portions 131b and 131e that are fixed to magnet holder 121, and arm portions 131c and 131f that couple lens holder-fixing portions 131a and 131d to magnet holder-fixing portions 131b and 131e. Lens holder-fixing portions 131a and 131d are coupled to each other along lens housing portion 111a of lens holder 111. Arm portions 131c and 131f are bent in zigzag, and are elastically deformed during the movement of AF movable part 11.

Further, upper spring 131 includes wire connection portion 131g that is connected to signal suspension wire 31A, and terminal connection portion 131h that is connected to signal input terminal 162e of AF printed circuit board 166. Wire connection portion 131g is connected to magnet holder-fixing portion 131e through two link portions 131i that extend to the corner from magnet holder-fixing portion 131e along the peripheral edge of magnet holder 121. Terminal connection portion 131h extends toward AF printed circuit board 166 from magnet holder-fixing portion 131b.

Likewise, upper spring 132 includes lens holder-fixing portions 132a and 132d, magnet holder-fixing portions 132b and 132e, and arm portions 132c and 132f. Lens holder-fixing portions 132a and 132d are coupled to each other along lens housing portion 111a of lens holder 111. Arm portions 132c and 132f are bent in zigzag, and are elastically deformed during the movement of AF movable part 11.

Further, upper spring 132 includes wire connection portion 132g that is connected to signal suspension wire 31B, and terminal connection portion 132h that is connected to signal input terminal 162f of AF printed circuit board 166. Wire connection portion 132g is connected to magnet holder-fixing portion 132e through two link portions 132i that extend to the corner from magnet holder-fixing portion 132e along the peripheral edge of magnet holder 121. Terminal connection portion 132h extends toward AF printed circuit board 166 from magnet holder-fixing portion 132b.

In this embodiment, fixing holes (of which reference numerals are omitted) of lens holder-fixing portions 131a, 131d, 132a, and 132d are fitted to positioning bosses (of which reference numerals are omitted) of upper spring-fixing portions 111d of lens holder 111, so that upper springs 131 and 132 are positioned with respect to lens holder 111 and are fixed to lens holder 111. Further, fixing holes (of which reference numerals are omitted) of magnet holder-fixing portions 131b, 131e, 132b, and 132e are fitted to positioning bosses (of which reference numerals are omitted) of upper spring-fixing portions 121f of magnet holder 121, so that upper springs 131 and 132 are positioned with respect to magnet holder 121 and are fixed to magnet holder 121.

Wire connection portions 131g and 132g are soldered to signal suspension wires 31A and 31B (see FIGS. 5 and 6), and are physically and electrically connected to signal suspension wires 31A and 31B. Terminal connection portions 131h and 132h are soldered to signal input terminals 162e and 162f of AF printed circuit board 166, and are physically and electrically connected to signal input terminals 162e and 162f. Upper springs 131 and 132 function as the AF signal lines that supply control signals supplied from signal suspension wires 31A and 31B to AF control part 16 (control IC 161).

AF power supply line 171 includes magnet holder-fixing portion 171a that is fixed to magnet holder 121, wire connection portion 171b that is connected to power-feed suspension wire 32A, and terminal connection portion 171c that is connected to power input terminal 162c of AF printed circuit board 166. Wire connection portion 171b is connected to magnet holder-fixing portion 171a through two link portions 171d that extend to the corner from magnet holder-fixing portion 171a along the peripheral edge of magnet holder 121. Terminal connection portion 171c extends toward AF printed circuit board 166 from magnet holder-fixing portion 171a.

Likewise, AF power supply line 172 includes magnet holder-fixing portion 172a that is fixed to magnet holder 121, wire connection portion 172b that is connected to power-feed suspension wire 32B, and terminal connection portion 172c that is connected to power input terminal 162d of AF printed circuit board 166. Wire connection portion 172b is connected to magnet holder-fixing portion 172a through two link portions 172d that extend to the corner from magnet holder-fixing portion 172a along the peripheral edge of magnet holder 121. Terminal connection portion 172c extends toward AF printed circuit board 166 from magnet holder-fixing portion 172a.

In this embodiment, fixing holes (of which reference numerals are omitted) of magnet holder-fixing portions 171a and 172a are fitted to positioning bosses (of which reference numerals are omitted) of upper spring-fixing portions 121f of magnet holder 121, so that AF power supply lines 171 and 172 are positioned with respect to magnet holder 121 and are fixed to magnet holder 121.

Wire connection portions 171b and 172b are soldered to power-feed suspension wires 32A and 32B (see FIGS. 5 and 6), and are physically and electrically connected to power-feed suspension wires 32A and 32B. Terminal connection portions 171c and 172c are soldered to power input terminals 162c and 162d of AF printed circuit board 166, and are physically and electrically connected to power input terminals 162c and 162d. AF power supply lines 171 and 172 supply power, which is supplied from power-feed suspension wires 32A and 32B, to AF control part 16 (control IC 161).

Here, it is preferable that solder used for electrical connection does not contain flux. Accordingly, since flux does not need to be cleaned after soldering, PAR or a PAR alloy having low solvent resistance can be used as the molding material of lens holder 111 and/or magnet holder 121.

Link portions 131i, 132i, 171d, and 172d of upper springs 131 and 132 and AF power supply lines 171 and 172 extend to the corners from holder-fixing portions 131e, 132e, 171a, and 172a. However, link portions 131i, 132i, 171d, and 172d may include portions extending inward from joining portions (corners), and wire connection portions 131g, 132g, 171b, and 172b may be provided at distal ends of the portions. That is, link portions 131i, 132i, 171d, and 172d, which are interposed between magnet holder-fixing portions 131e, 132e, 171a, and 172a and wire connection portions 131g, 132g, 171b, and 172b, may be adapted to include multiple joints while ensuring a link length. Accordingly, since stress, which is generated in link portions 131i, 132i, 171d, and 172d during optical image stabilization, is relieved, tilt characteristics are improved and resistance against an impact caused by falling or the like is improved.

Arm portions 131c, 131f, 132c, and 132f of upper springs 131 and 132 are provided with damping members 131j, 131k, 132j, and 132k. Accordingly, the excessive movement of arm portions 131c, 131f, 132c, and 132f, which occurs in a case where lens holder 111 is moved in the optical-axis direction, is suppressed, so that interference between upper springs 131 and 132 and the other members can be prevented. Therefore, the stability of an operation is improved.

Damping members 131m and 132m are provided between magnet holder-fixing portions 131e and 132e and wire connection portions 131g and 132g of upper springs 131 and 132. Further, damping members 171e and 172e are provided between magnet holder-fixing portions 171a and 172a and wire connection portions 171b and 172b of AF power supply lines 171 and 172. Accordingly, since the occurrence of unnecessary resonance (high-order resonance mode) is suppressed, the stability of an operation is improved.

For example, an ordinary temperature-curable silyl group polymer-based elastic adhesive can be employed as damping members 131j, 131k, 131m, 132j, 132k, 132m, 171e, and 172e, and can be easily applied using, for example, a dispenser.

In this embodiment, upper springs 131 and 132 are made to function as the AF signal line and AF power supply lines 171 and 172 are provided separately from upper springs 131 and 132. However, upper springs 131 and 132 may be made to function as the AF power supply lines and AF signal lines may be provided separately from upper springs 131 and 132.

As shown in FIGS. 7 and 8, AF support part 14 (lower springs 141 and 142) of AF movable part 11 is disposed on the image formation side in the optical-axis direction and elastically supports AF movable part 11 (lens holder 111) with respect to AF fixing part 12 (magnet holder 121). The configuration of lower springs 141 and 142 is shown in FIG. 18. FIG. 18 is a bottom view of OIS movable part 10. Lower springs 141 and 142 are made of, for example, titanium copper, nickel copper, stainless steel, or the like as with upper springs 131 and 132 and AF power supply lines 171 and 172.

As shown in FIG. 18, each of lower springs 141 and 142 has a rectangular shape in plan view as a whole, that is, the same shape as magnet holder 121. Lower springs 141 and 142 are disposed on magnet holder 121 not to be in contact with each other. Lower springs 141 and 142 are formed by the etching of, for example, a piece of sheet metal.

Lower spring 141 includes lens holder-fixing portions 141a and 141d that are fixed to lens holder 111, magnet holder-fixing portions 141b and 141e that are fixed to magnet holder 121, and arm portions 141c and 141f that couple lens holder-fixing portions 141a and 141d to magnet holder-fixing portions 141b and 141e.

Magnet holder-fixing portions 141b and 141e are coupled to each other along the outer edge of magnet holder 121. Arm portions 141c and 141f are bent in zigzag so as to be curved along the outer edges of magnets 122A and 122D, and are elastically deformed during the movement of AF movable part 11. Arm portions 141c and 141f are positioned closer to the light-receiving side than the lower surfaces of magnets 122A and 122D in the optical-axis direction at the neutral point. In other words, magnets 122A and 122D protrude toward the image formation side in the optical-axis direction more than lower spring 141.

Further, lower spring 141 includes coil connection portion 141g that is connected to tying portion 111e of lens holder 111, and terminal connection portion 141h that is connected to power output terminal 162a of AF printed circuit board 166. Coil connection portion 141g is connected to lens holder-fixing portion 141d. Terminal connection portion 141h extends toward AF printed circuit board 166 from magnet holder-fixing portion 141b.

Likewise, the lower spring 142 includes lens holder-fixing portions 142a and 142d that are fixed to lens holder 111, magnet holder-fixing portions 142b and 142e that are fixed to magnet holder 121, and arm portions 142c and 142f that couple lens holder-fixing portions 142a and 142d to magnet holder-fixing portions 142b and 142e.

Magnet holder-fixing portions 142b and 142e are coupled to each other along the outer edge of magnet holder 121. Arm portions 142c and 142f are bent in zigzag so as to be curved along the outer edges of magnets 122B and 122C, and are elastically deformed during the movement of AF movable part 11. Arm portions 142c and 142f are positioned closer to the light-receiving side than the lower surfaces of magnets 122B and 122C in the optical-axis direction at the neutral point. In other words, magnets 122B and 122C protrude toward the image formation side in the optical-axis direction more than lower spring 141.

Further, lower spring 142 includes coil connection portion 142g that is connected to tying portion 111e of lens holder 111, and terminal connection portion 142h that is connected to power output terminal 162b of AF printed circuit board 166. Coil connection portion 142g is connected to lens holder-fixing portion 142d. Terminal connection portion 142h extends toward AF printed circuit board 166 from magnet holder-fixing portion 142b.

In this embodiment, fixing holes of lens holder-fixing portions 141a, 141d, 142a, and 142d are fitted to positioning bosses of lower spring-fixing portions 111g of lens holder 111, so that lower springs 141 and 142 are positioned with respect to lens holder 111 and are fixed to lens holder 111. Furthermore, fixing holes of magnet holder-fixing portions 141b, 141e, 142b, and 142e are fitted to positioning bosses of lower spring-fixing portions 121g of magnet holder 121, so that lower springs 141 and 142 are positioned with respect to magnet holder 121 and are fixed to magnet holder 121.

Coil connection portions 141g and 142g are soldered to AF coil 112, which is tied to tying portions 111e and 111e of lens holder 111, and are physically and electrically connected to AF coil 112. Terminal connection portions 141h and 142h are soldered to power output terminals 162a and 162b of AF printed circuit board 166, and are physically and electrically connected to power output terminals 162a and 162b. As described above, it is preferable that solder used for electrical connection does not contain flux. Lower springs 141 and 142 function as coil power supply lines that supply power supplied from control IC 161 to AF coil 112.

Figure 19:
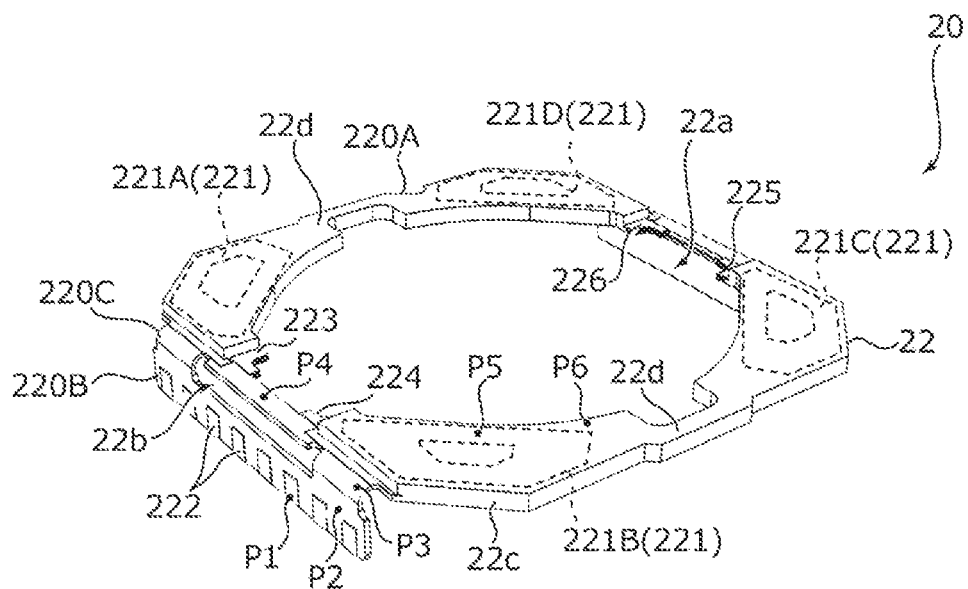
FIG. 19 is an exploded perspective view of an OIS fixing part.
Figure 19:
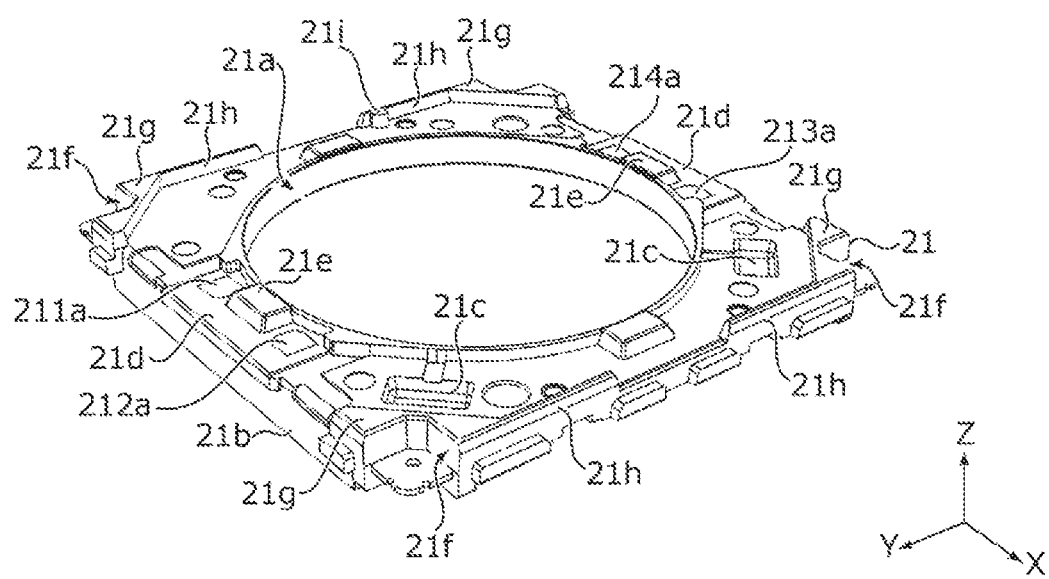
Figure 20:
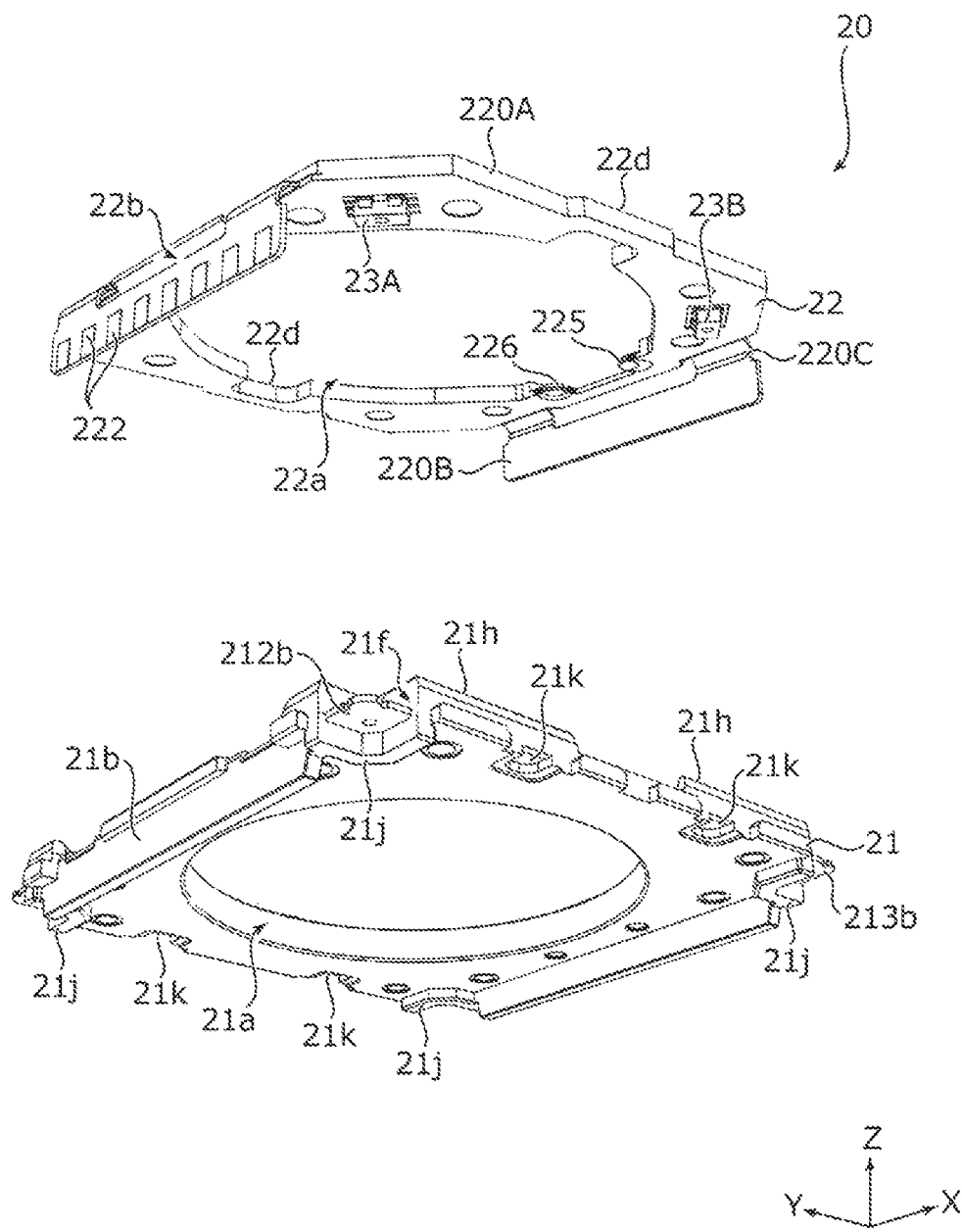
FIG. 20 is an exploded perspective view of the OIS fixing part.

FIGS. 19 and 20 are exploded perspective views of OIS fixing part 20. FIG. 19 is an upper perspective view and FIG. 20 is a lower perspective view.

As shown in FIGS. 19 and 20, OIS fixing part 20 includes base 21, coil base plate 22, X-position detection part 23A, Y-position detection part 23B, and the like.

X-position detection part 23A and Y-position detection part 23B are hall elements that detect changes in magnetic fields by using Hall effect (hereinafter, referred to as "hall elements 23A and 23B"). Hall elements 23A and 23B are mounted on the back of coil base plate 22. In this embodiment, hall elements 23A and 23B are disposed at positions corresponding to OIS coils 221B and 221C. In a case where OIS movable part 10 sways in the optical-axis-orthogonal plane, magnetic fields generated by driving magnets 122 are changed. Hall elements 23A and 23B detects changes in the magnetic fields, so that the position of OIS movable part 10 in the optical-axis-orthogonal plane is detected. In a case where the layouts of hall elements 23A and 23B and driving magnets 122 are designed so that magnetic flux proportional to the moving distance of OIS movable part 10 crosses the detection surfaces of hall elements 23A and 23B, hall outputs proportional to the moving distance of OIS movable part 10 can be obtained. Magnets for detecting an X position and a Y position may be arranged on OIS movable part 10 separately from driving magnets 122.

Figure 21A:
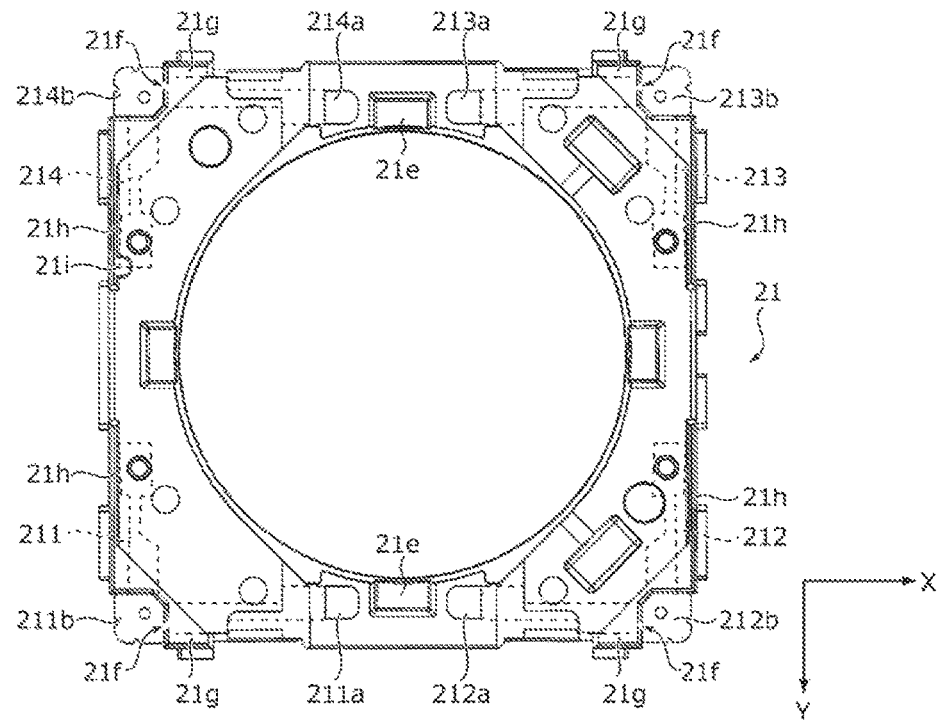
FIGS. 21A and 21B are diagrams showing the configuration of a base.
Figure 21B:
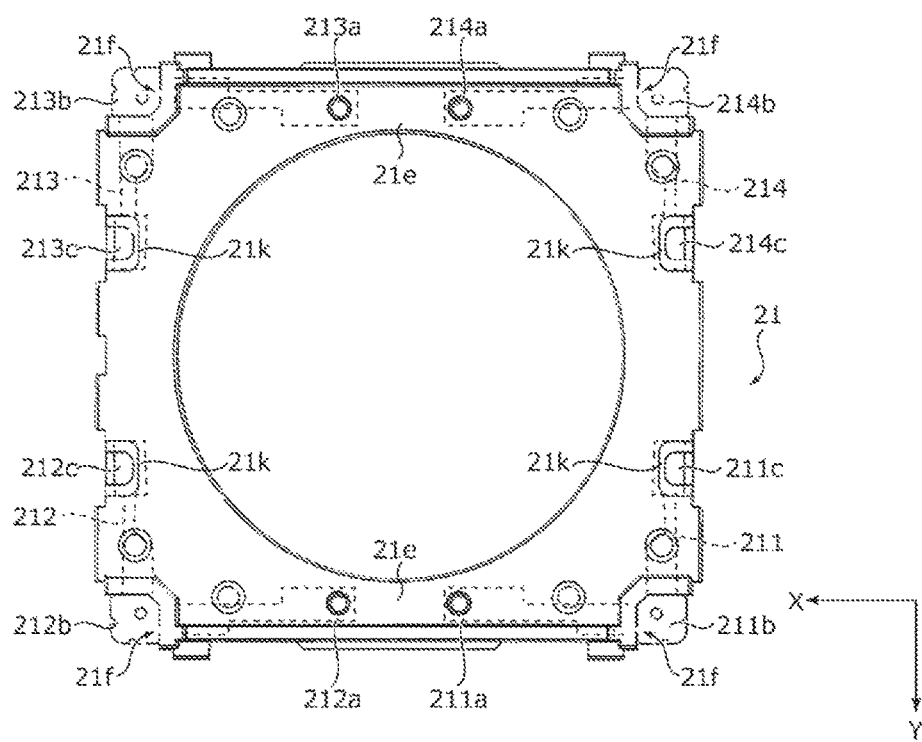

Base 21 is a support member that supports coil base plate 22. FIG. 21A is a plan view of base 21, and FIG. 21B is a bottom view of base 21. FIGS. 21A and 21B show the inside of base 21 that is seen through.

Base 21 is a member having a rectangular shape in plan view, and includes circular opening 21a that is formed at the center thereof. Base 21 includes terminal mounting portions 21b that are formed on the peripheral edge portion thereof at positions corresponding to terminal portions 220B of coil base plate 22.

Base 21 includes hall element housing portions 21c that are formed on the peripheral edge portion of opening 21a and houses hall elements 23A and 23B. Further, base 21 includes terminal housing portions 21d that house power-feed terminals 223 and 224 and signal terminals 225 and 226 of coil base plate 22. Terminal housing portions 21d are formed to protrude outward in the radial direction more than terminal mounting portions 21b.

Base 21 includes reinforcing ribs 21g and reinforcing ribs 21h that are formed on the upper surface thereof at four corners and peripheral edges extending in the Y direction, respectively. Base 21 includes reinforcing ribs 21j that are formed on the lower surface thereof at four corners. Cutout 21f is formed at each of reinforcing ribs 21g and 21j so as to be recessed inward in the radial direction. Further, one of reinforcing ribs 21h includes projecting portion 21i that is used to determine a direction where coil base plate 22 is to be placed. Since the mechanical strength of base 21 is increased by reinforcing ribs 21g, 21h, and 21j, the thickness of base 21 can be reduced. Particularly, since base 21 includes reinforcing ribs 21h extending along the peripheral edge portions, base 21 is a structure that is also resistant to torsion.

Further, base 21 includes adhesive fixing portions 21k that are formed on the lower surface thereof at the peripheral edges extending in the Y direction. An adhesive (for example, epoxy resin) is applied to adhesive fixing portions 21k in a case where cover 3 is to be mounted on base 21.

Four terminal fixtures 211 to 214 are embedded in base 21. Terminal fixtures 211 to 214 are formed integrally with base 21 by, for example, insert molding. Terminal fixtures 211 to 214 have an L shape, and are arranged at the four corners of base 21. One end portions 211a to 214a of terminal fixtures 211 to 214 are exposed from terminal housing portions 21d of base 21.

Intermediate portions (bent portions) 211b to 214b of terminal fixtures 211 to 214 are exposed from cutouts 21f of the four corners of base 21. Intermediate portions 211b to 214b are positioned closer to the image formation side in the optical-axis direction than the surface of base 21 that faces the light-receiving side in the optical-axis direction. One ends of suspension wires 30 are connected to intermediate portions 211b to 214b of terminal fixtures 211 to 214. Accordingly, it is possible to ensure the effective lengths of suspension wires 30 while reducing the height of lens driving device 1. Therefore, since the fracture of suspension wires 30 caused by metal fatigue or the like can be suppressed, the reliability of lens driving device 1 is improved.

The other end portions 211c to 214c of terminal fixtures 211 to 214 are exposed from adhesive fixing portions 21k of base 21, and an adhesive is applied to the other end portions 211c to 214c in a case where cover 3 is to be mounted on base 21. Since adhesion strength, which is to be obtained in a case where cover 3 is mounted on base 21, is improved by an anchoring effect, falling impact resistance is improved.

Terminal fixture 211 is soldered to power-feed terminal 223 of coil base plate 22 and power-feed suspension wire 32A, and is physically and electrically connected to power-feed terminal 223 and power-feed suspension wire 32A. Terminal fixture 212 is soldered to power-feed terminal 224 of coil base plate 22 and power-feed suspension wire 32B, and is physically and electrically connected to power-feed terminal 224 and power-feed suspension wire 32B. Terminal fixture 213 is soldered to signal terminal 225 of coil base plate 22 and signal suspension wire 31B, and is physically and electrically connected to signal terminal 225 and signal suspension wire 31B. Terminal fixture 214 is soldered to signal terminal 226 of coil base plate 22 and signal suspension wire 31A, and is physically and electrically connected to signal terminal 226 and signal suspension wire 31A.

Base 21 includes protruding portions 21e that protrude toward the light-receiving side in the optical-axis direction so as to separate adjacent terminal fixtures 211 and 212 and adjacent terminal fixtures 213 and 214. Protruding portion 21e is disposed between end portions 211a and 212a of terminal fixtures 211 and 212, and protruding portion 21e is disposed between end portions 213a and 214a of terminal fixtures 213 and 214. Since terminal fixtures 211 and 212 are spatially separated from each other by protruding portion 21e and terminal fixtures 213 and 214 are spatially separated from each other by protruding portion 21e and insulation is ensured, safety and reliability are improved.

In this embodiment, as with lens holder 111, base 21 is made of a molding material that is formed of polyarylate (PAR) or a PAR alloy (for example, PAR/PC) where a plurality of resin materials including PAR are mixed. Accordingly, since weld strength is high, toughness and impact resistance can be ensured even though the thickness of base 21 is reduced. Therefore, the external size of lens driving device 1 can be reduced, so that the size and weight of lens driving device 1 can be reduced.

Further, it is preferable that base 21 is formed by multiple-gate injection molding. In this case, it is preferable that the diameter of the gate is 0.3 mm or more. Accordingly, since fluidity during molding is improved, thin-wall molding can be performed and the generation of a sink mark can be prevented even in a case where PAR or a PAR alloy is used as a molding material.

The molding material formed of PAR or a PAR alloy has electrical conductivity and it is particularly preferable that the volume resistivity of the molding material is in the range of $10^9$ to $10^{11}$ Ω·cm. For example, it is possible to give electrical conductivity to the molding material by mixing carbon nanotubes into existing PAR or an existing PAR alloy. In this case, it is possible to give appropriate electrical conductivity to the molding material by adjusting the carbon nanotube content of the molding material. Accordingly, since the charging of base 21 can be suppressed, the generation of static electricity can be prevented.

It is preferable that PAR or a PAR alloy as the molding material of base 21 contains fluorine in a case where the movement of AF movable part 11 (lens holder 111) in the optical-axis direction is regulated by the contact between lens holder 111 and base 21. Accordingly, since an intermolecular force is reduced, an attractive force of a portion, which comes into contact with lens holder 111, is reduced and the slidability of base 21 is improved. Therefore, the generation of dust, which is caused by friction in a case where lens holder 111 and coil base plate 22 come into contact with each other, can be prevented.

Figure 22:
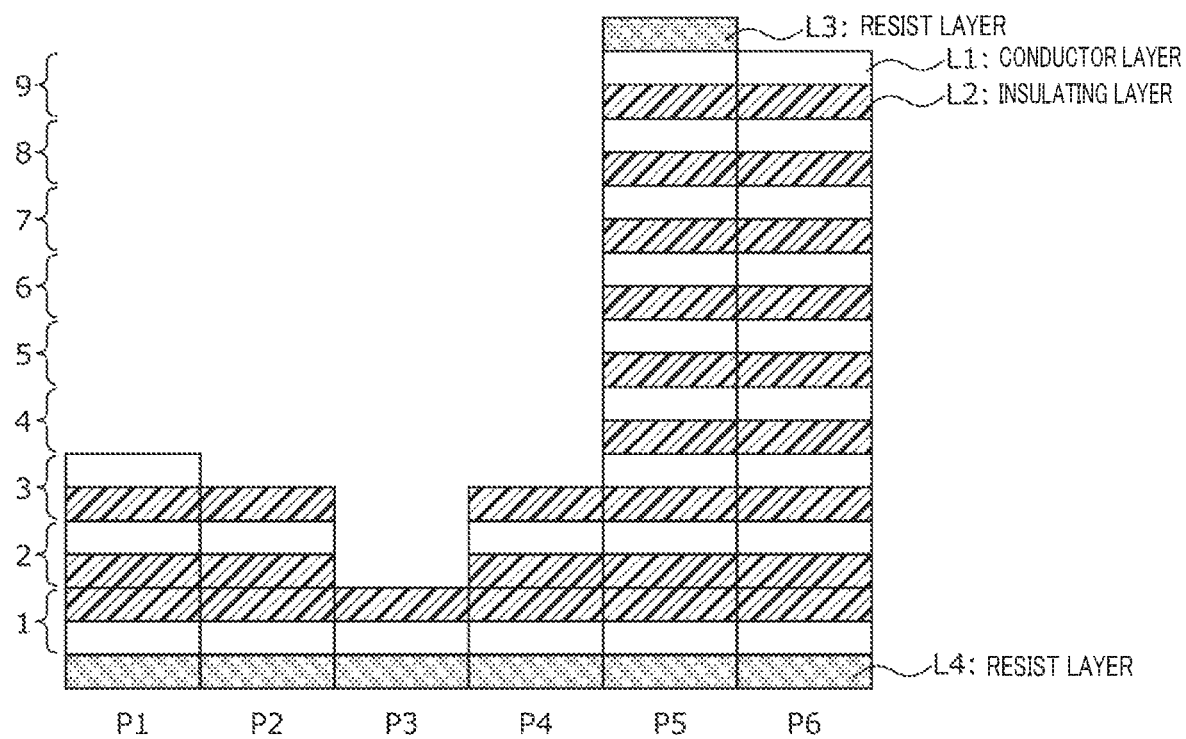
FIG. 22 is a diagram showing the laminated structure of a coil base plate.

As shown in FIGS. 19 and 20, coil base plate 22 is a substrate having a rectangular shape in plan view as with base 21, and includes circular opening 22a that is formed at the center thereof. Coil base plate 22 is a multilayer printed circuit board in which a plurality of unit layers, each of which includes conductor layer L1 and insulating layer L2 (see FIG. 22), are laminated. In this embodiment, OIS coils 221, external terminals 222, and a conductor pattern (not shown) including power supply lines connecting external terminals 222 to OIS coils 221 are integrally formed in coil base plate 22. FIG. 22 shows the layer structure of coil base plate 22 of FIG. 19 at respective points P1 to P6.

Conductor layer L1 of coil base plate 22 is made of, for example, copper foil. Insulating layer L2 is made of, for example, a liquid crystal polymer (LCP). Resist layers L3 and L4 are formed on the surface and back of coil base plate 22 as necessary.

Coil base plate 22 includes main base plate portion 220A, terminal portions 220B, and coupling portions 220C. A first laminated structure forming main base plate portion 220A, a second laminated structure forming terminal portions 220B, and a third laminated structure forming coupling portions 220C are increased in the number of laminated layers in this order. In this embodiment, main base plate portion 220A is formed of nine unit layers, each terminal portion 220B is formed of three unit layers, and each coupling portion 220C is formed of one unit layer.

Main base plate portion 220A includes OIS coils 221 that are arranged at positions facing driving magnets 122 in the optical-axis direction. OIS coils 221 are formed of four OIS coils 221A to 221D corresponding to magnets 122A to 122D. OIS coils 221A to 221D are formed in main base plate portion 220A in a process for manufacturing coil base plate 22. In this embodiment, OIS coils 221A to 221D are formed of seven unit layers (Layer Nos. 3 to 9) of the nine unit layers of main base plate portion 220A. The remaining two unit layers (Layer Nos. 1 and 2) of main base plate portion 220A are connection layers in which conductor patterns including wiring for connecting OIS coils 221 and hall elements 23A and 23B to external terminals 222 are formed.

The sizes and arrangement of OIS coils 221A to 221D and magnets 122A to 122D are set so that the edges of magnets 122A to 122D in the radial direction are within the widths of the cross-sections of respective OIS coils 221A to 221D, that is, a magnetic field emitted from the bottom of each of magnets 122A to 122D crosses two opposite sides of each of OIS coils 221A to 221D and returns to each of magnets 122A to 122D. Here, each of OIS coils 221A to 221D has the same shape as the planar shape (here, the shape of a substantially isosceles trapezoid) of each of magnets 122A to 122D. Accordingly, it is possible to efficiently generate a driving force (electromagnetic force) for allowing OIS movable part 10 to sway in the optical-axis-orthogonal plane.

Since OIS coils 221A and 221C are connected to each other and OIS coils 221B and 221D are connected to each other, the same current flows in OIS coils 221A and 221C and the same current flows in OIS coils 221B and 221D. Magnets 122A and 122C and OIS coils 221A and 221C form the OIS voice coil motor that allows OIS movable part 10 to sway in the U direction (see FIG. 11). Magnets 122B and 122D and OIS coils 221B and 221D form the OIS voice coil motor that allows OIS movable part 10 to sway in the V direction (see FIG. 11).

The corners of main base plate portion 220A are formed in shapes corresponding to reinforcing ribs 21g of base 21 (cut portions 22c). Further, the movement of AF movable part 11 to the image formation side in the optical-axis direction is regulated by the contact between peripheral edge portions 22d of main base plate portion 220A, which extend in the Y direction, and holder-side contact portions 111i in a case where AF movable part 11 is moved to the image formation side in the optical-axis direction (hereinafter, referred to as "base-side contact portions 22d"). The side surfaces of base-side contact portions 22d are formed in shapes corresponding to reinforcing ribs 21h of base 21.

Regions, in which OIS coils 221 are arranged, of the upper surface of main base plate portion 220A (the surface of main base plate portion 220A facing the light-receiving side in the optical-axis direction) are covered with resist layer L3. On the other hand, resist layer L3 is not formed on the upper surfaces (of portions which are to come into contact with AF movable part 11) of base-side contact portions 22d, so that conductor layer L1 is exposed to the outside. Accordingly, the attitude of AF movable part 11, which is obtained in a case where the movement of AF movable part 11 to the image formation side in the optical-axis direction, can be stabilized. Further, it is possible to prevent the generation of dust that is caused by friction in a case where holder-side contact portions 111i come into contact with the upper surfaces of base-side contact portions 22d. Insulating layer L2 may be exposed to the outside on the upper surfaces of base-side contact portions 22d.

Hall elements 23A and 23B are mounted on the lower surface of main base plate portion 220A. Furthermore, main base plate portion 220A includes power-feed terminals 223 and 224 and signal terminals 225 and 226. Power-feed terminals 223 and 224 and signal terminals 225 and 226 are physically and electrically connected to terminal fixtures 211 to 214 (end portions 211a to 214a exposed from terminal housing portions 21d) of base 21. OIS coils 221A to 221D, hall elements 23A and 23B, power-feed terminals 223 and 224, and signal terminals 225 and 226 are electrically connected to external terminals 222 of terminal portions 220B through the conductor pattern (not shown) formed in coil base plate 22.

The conductor pattern of coil base plate 22 includes power supply lines (two, not shown) that are used to feed power to OIS movable part 10 (AF control part 16), power supply lines (two×2, not shown) that are used to feed power to OIS coils 221A to 221D, power supply lines (two×2, not shown) that are used to feed power to hall elements 23A and 23B, signal lines (two×2, not shown) for detection signals that are to be output from hall elements 23A and 23B, and signal lines (two, not shown) for control signals that are used to control the autofocus operation of OIS movable part 10.

Terminal portions 220B are provided so as to face each other in the Y direction. Each of terminal portions 220B includes eight external terminals 222, that is, terminal portions 220B include a total of sixteen external terminals 222. External terminals 222 include power-feed terminals (two) that are used to feed power to AF control part 16, signal terminals (two) that are used to output signals to AF control part 16, power-feed terminals (four) that are used to feed power to OIS coils 221, power-feed terminals (four) that are used to feed power to hall elements 23A and 23B, and signal terminals (four).

Coupling portions 220C couple main base plate portion 220A to terminal portions 220B. Coupling portions 220C have a round shape, and are formed so that terminal portions 220B are hung down from main base plate portion 220A. Terminal portions 220B extend substantially perpendicular to main base plate portion 220A. Further, each coupling portion 220C includes an opening 22b that is formed substantially in the middle thereof in the X direction.

In this embodiment, the number of laminated layers of coupling portion 220C is smaller than the number of laminated layers of each of main base plate portion 220A and terminal portions 220B. Accordingly, coupling portions 220C can be relatively easily curved to have a round shape.

Main base plate portion 220A and terminal portions 220B of coil base plate 22 are adhered to base 21, so that OIS fixing part 20 is assembled. In this case, cut portions 22c of coil base plate 22 are engaged with reinforcing ribs 21g of base 21. Further, base-side contact portions 22d of coil base plate 22 are engaged with reinforcing ribs 21h of base 21 and projecting portion 21i formed on reinforcing rib 21h. Furthermore, side portions of terminal housing portions 21d of base 21 are engaged with openings 22b of coil base plate 22.

Accordingly, coil base plate 22 is accurately positioned with respect to base 21 and is firmly fixed to base 21.

In this embodiment, base 21 and coil base plate 22 are adhered to each other by an epoxy resin material having elasticity. Base 21 and coil base plate 22 are integrated with each other by adhesion, so that the mechanical strength of OIS fixing part 20 is increased. Accordingly, it is possible to reduce the thickness of base 21 and the thickness of coil base plate 22 while ensuring desired falling impact resistance.

Figure 23A:
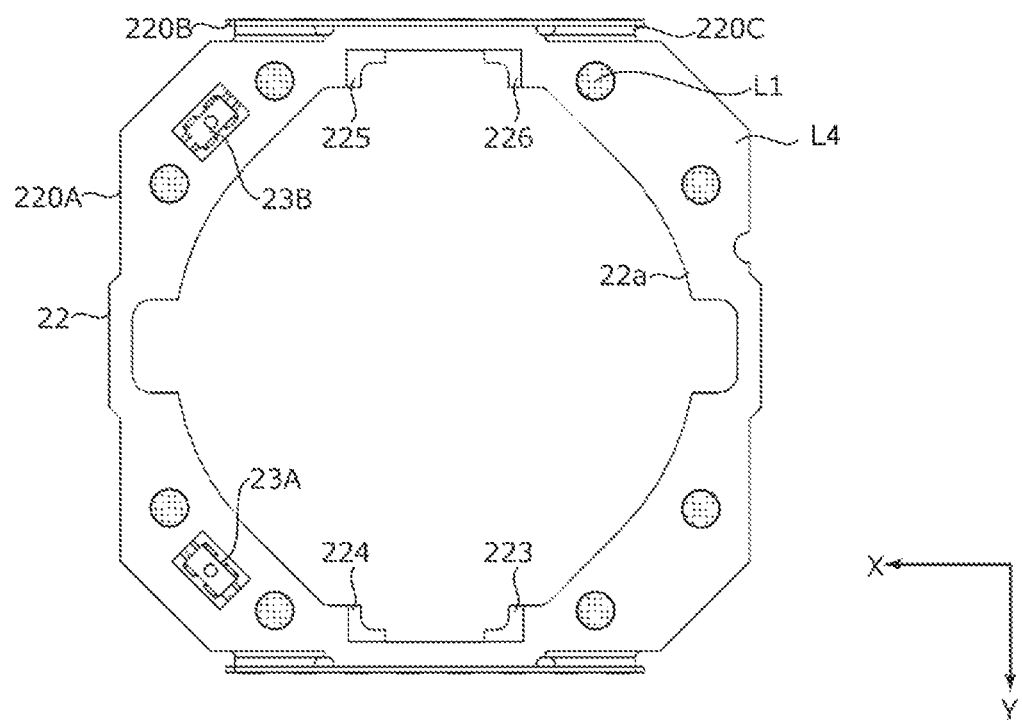
FIGS. 23A and 23B are bottom views showing the structure of the coil base plate.

It is preferable that the back (the surface facing the image formation side in the optical-axis direction) of main base plate portion 220A is covered with resist layer L4 and conductor layer L1 is exposed from a part of resist layer L4 as shown in FIG. 23A. Accordingly, since the adhesion strength between base 21 and coil base plate 22 is increased, OIS fixing part 20 can be formed as a strong structure.

Figure 23B:
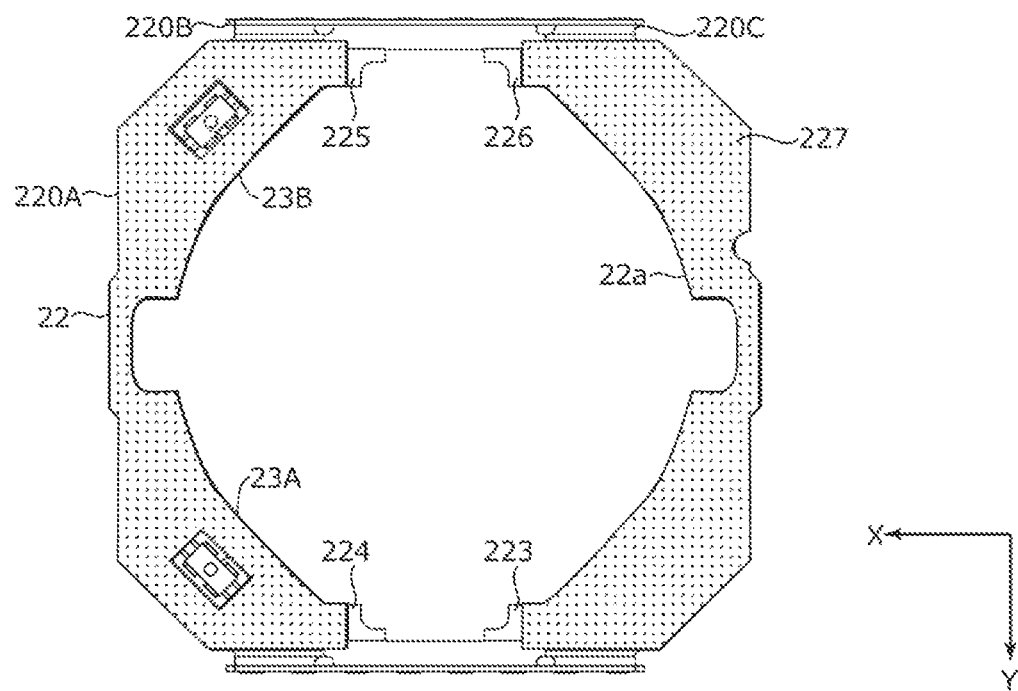

Alternatively, the back of main base plate portion 220A may be covered with magnetic plated layer 227 as shown in FIG. 23B. Magnetic plated layer 227 is a NiCu plate having a thickness in the range of, for example, 30 to 50 µm that is covered with Ni plating having a thickness in the range of 5 to 10 µm. Accordingly, since OIS fixing part 20 can be formed as a strong structure and magnetic flux crossing OIS coils 221 is increased, a thrust during an operation for optical image stabilization can be increased.

In lens driving device 1, one ends of signal suspension wires 31A and 31B are physically and electrically connected to wire connection portions 131g and 132g of upper springs 131 and 132, respectively. The other ends of signal suspension wires 31A and 31B are physically and electrically connected to terminal fixtures 214 and 213 of base 21 (the portions 214b and 213b exposed from cutouts 21f). Further, terminal fixtures 214 and 213 of base 21 are physically and electrically connected to signal terminals 226 and 225 of coil base plate 22.

Furthermore, one ends of power-feed suspension wires 32A and 32B are physically and electrically connected to wire connection portions 171b and 172b of AF power supply lines 171 and 172, respectively. The other ends of power-feed suspension wires 32A and 32B are physically and electrically connected to terminal fixtures 211 and 212 of base 21 (portions 211b and 212b exposed from cutouts 21f). Moreover, terminal fixtures 211 and 212 of base 21 are physically and electrically connected to power-feed terminals 223 and 224 of coil base plate 22.

Figure 24:
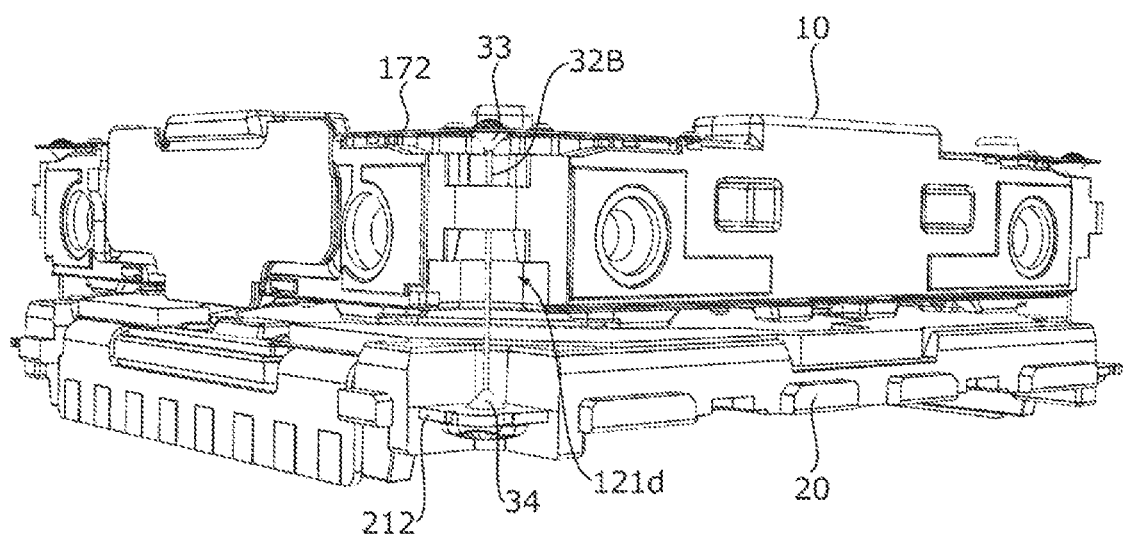
FIG. 24 is a diagram showing the support structure of the OIS fixing part and the OIS movable part.

Damping members 33 and 34 are arranged at portions where signal suspension wires 31A and 31B are connected to upper springs 131 and 132 and terminal fixtures 214 and 213 and portions where power-feed suspension wires 32A and 32B are connected to AF power supply lines 171 and 172 and terminal fixtures 211 and 212, that is, at the fixed ends of signal suspension wires 31A and 31B and power-feed suspension wires 32A and 32B (see FIG. 24). Specifically, damping members 33 are arranged on the lower surfaces (the surfaces facing the image formation side in the optical-axis direction) of upper springs 131 and 132 and AF power supply lines 171 and 172 so as to surround signal suspension wires 31A and 31B and power-feed suspension wires 32A and 32B. Further, damping members 34 are arranged on the upper surfaces (the surfaces facing the light-receiving side in the optical-axis direction) of terminal fixtures 214, 213, 211, and 212 so as to surround signal suspension wires 31A and 31B and power-feed suspension wires 32A and 32B. Accordingly, stress generated in signal suspension wires 31A and 31B is distributed. Therefore, since the fracture of suspension wires 30 caused by metal fatigue or the like can be suppressed, the reliability of lens driving device 1 is improved.

In lens driving device 1, control signals are supplied to AF control part 16 from coil base plate 22 through base 21, signal suspension wires 31A and 31B, and upper springs 131 and 132. Furthermore, power is fed to AF control part 16 from coil base plate 22 through base 21, power-feed suspension wires 32A and 32B, and AF power supply lines 171 and 172. In addition, power is fed to AF coil 112 from AF control part 16 through lower springs 141 and 142. Accordingly, the control of the operation of AF movable part 11 (specifically, the control of current flowing in AF coil 112) is realized.

Since control IC 161 of AF control part 16 includes hall element 165 and the coil control part and closed loop control based on the detection result of hall element 165 is completed in AF control part 16, power and control signals may be supplied to AF control part 16 by four suspension wires 31A, 31B, 32A, and 32B. Accordingly, the configuration of suspension wires 30, which are used for the driving of AF coil 112 and hall element 165, can be simplified and the reliability of the AF driving part can be improved.

Further, since the terminals arranged on AF printed circuit board 166 on which control IC 161 is mounted are dispersed, the degree of freedom in design is improved more than that in a case where wiring (the AF power supply lines, the AF signal lines, and the coil power supply lines) is led together to any one of the light-receiving side of lens driving device 1 in the optical-axis direction and the image formation side of lens driving device 1 in the optical-axis direction. Furthermore, since the solder area can be increased, poor connection can be reduced and reliability can be improved.

Current flows in OIS coils 221A to 221D in a case where optical image stabilization is performed in lens driving device 1. Specifically, in the OIS driving part, current flowing in OIS coils 221A to 221D is controlled on the basis of a detection signal output from a shake detection part (not shown, for example, gyro sensor) so that the shake of camera module A is offset. In this case, the detection results of hall elements 23A and 23B are fed back, so that the swaying of OIS movable part 10 can be accurately controlled.

In a case where current flows in OIS coils 221A to 221D, Lorentz force is generated on OIS coils 221A to 221D by an interaction between the magnetic fields of magnets 122A to 122D and the current flowing in OIS coils 221A to 221D (Fleming's left-hand rule). The direction of Lorentz force is a direction (the V direction or the U direction) orthogonal to the direction (the U direction or the V direction) of the current and the direction (Z direction) of magnetic fields at the long side portions of OIS coils 221A to 221D. Since OIS coils 221A to 221D are fixed, a reaction force acts on magnets 122A to 122D. This reaction force serves as a driving force of the OIS voice coil motor and OIS movable part 10 including driving magnets 122 sways in the XY plane, so that optical image stabilization is performed.

In a case where automatic focusing is performed in lens driving device 1, current flows in AF coil 112. Current flowing in AF coil 112 is controlled by AF control part 16 (control IC 161). Specifically, control IC 161 controls current, which flows in AF coil 112, on the basis of control signals that are supplied through signal suspension wires 31A and 31B and upper springs 131 and 132 and the detection result of hall element 165 that is built in control IC 161.

In a case where focusing is not performed and current does not flow, AF movable part 11 is made to be in a state where AF movable part 11 is hung between an infinity position and a macro position (neutral point) by upper springs 131 and 132 and lower springs 141 and 142. That is, AF movable part 11 (lens holder 111) of OIS movable part 10 is elastically supported by upper springs 131 and 132 and lower springs 141 and 142 so as to be displaceable to both sides in the Z direction in a state where AF movable part 11 is positioned with respect to AF fixing part 12 (magnet holder 121).

In a case where current flows in AF coil 112, Lorentz force is generated on AF coil 112 by an interaction between the magnetic fields of driving magnets 122 and the current flowing in AF coil 112. The direction of Lorentz force is a direction (Z direction) orthogonal to the direction (the U direction or the V direction) of magnetic fields and the direction (the V direction or the U direction) of the current flowing in AF coil 112. Since driving magnets 122 are fixed, a reaction force acts on AF coil 112. This reaction force serves as a driving force of the AF voice coil motor and AF movable part 11 including AF coil 112 is moved in the optical-axis direction, so that focusing is performed.

In AF control part 16 of lens driving device 1, closed loop control is performed on the basis of a detection signal of hall element 165 that is built in control IC 161. According to a closed loop control system, it is not necessary to consider hysteresis characteristics of the voice coil motor and it is possible to directly detect that the position of AF movable part 11 is stabilized. In addition, it is also possible to cope with automatic focusing using an imaging surface-detection system. Accordingly, the response performance of lens driving device 1 is high and an autofocus operation can be increased in speed.

As described above, lens driving device 1 includes the OIS driving part that includes driving magnets 122 (OIS magnets) arranged around lens part 2 and OIS coils 221 disposed so as to be spaced apart from driving magnets 122 in the optical-axis direction and allows OIS movable part 10 including driving magnets 122 to sway with respect to OIS fixing part 20 including OIS coils 221 in a plane orthogonal to the optical-axis direction.

In lens driving device 1, OIS movable part 10 includes magnet holder 121 to which driving magnets 122 are fixed by adhesion, the adhesion surfaces of magnet holder 121 to which driving magnets 122 adhere are parallel to the optical-axis direction, and the end portions of the adhesion surfaces facing the image formation side in the optical-axis direction (the first end portions of the adhesion surfaces facing the optical image stabilization fixing part in the optical-axis direction) are opened. Further, each adhesion surface includes recessed portions 121*j* that extend in the optical-axis direction toward the end portion (the second end portion opposite to the first end portion) of the adhesion surface facing the light-receiving side in the optical-axis direction from a portion positioned closer to the inside than the end portion of the adhesion surface facing the image formation side in the optical-axis direction.

According to lens driving device 1, since adhesion strength between the magnet holder 121 and each driving magnet 122 is improved, the size and weight of lens driving device 1 can be reduced and the reliability of lens driving device 1 can be improved.

The present invention made by the inventor has been specifically described above on the basis of the embodiment, but the present invention is not limited to the above-mentioned embodiment and can be modified without departing from the scope of the present invention.

For example, smartphone M, which is a portable terminal with a camera, has been described in the embodiment as an example of the camera-mounted device including camera module A, but the present invention can be applied to a camera-mounted device that includes a camera module and an image processing part for processing image information obtained by the camera module. The camera-mounted device includes an information device and a transporting device. The information device includes, for example, a mobile phone with a camera, a laptop computer, a tablet terminal, a portable game machine, a web camera, and an on-vehicle device with a camera (for example, a back monitor device and a drive recorder device). Further, the transporting device includes, for example, an automobile.

Figure 25A:
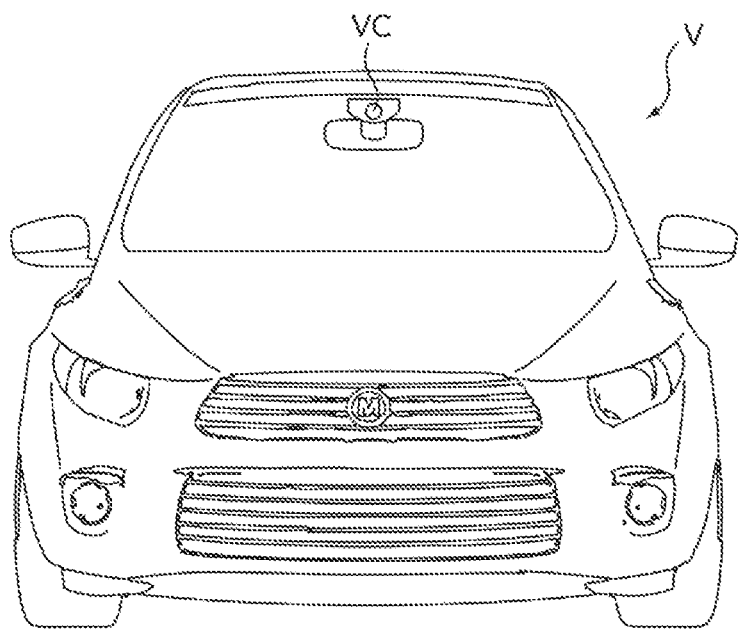
FIGS. 25A and 25B are diagrams showing an automobile as a camera-mounted device on which an in-vehicle camera module is mounted.
Figure 25B:
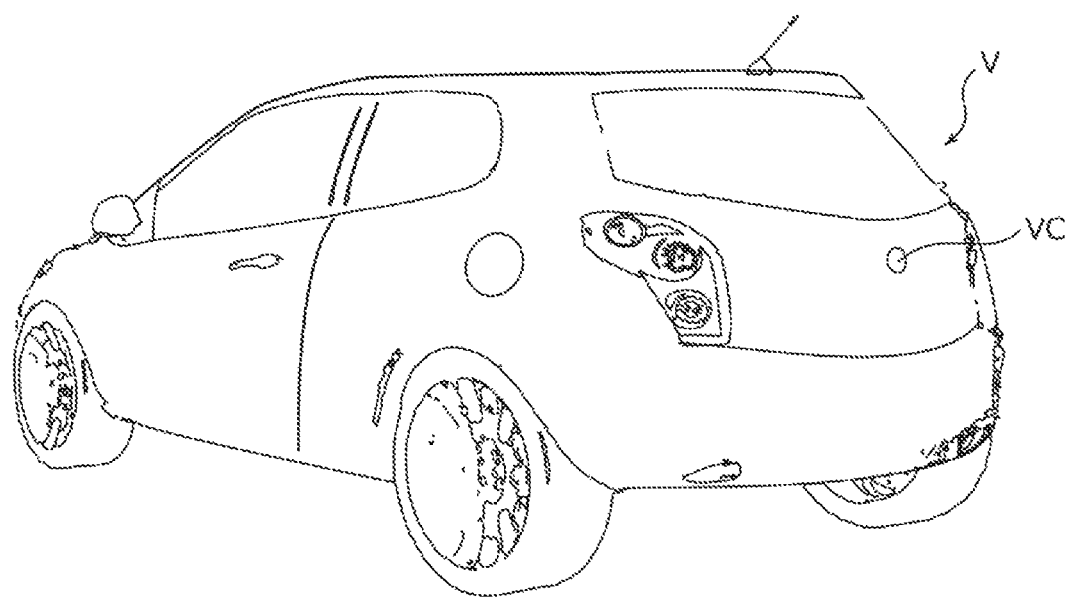

FIGS. 25A and 25B are diagrams showing an automobile V as a camera-mounted device on which an in-vehicle camera module VC (Vehicle Camera) is mounted. FIG. 25A is a front view of automobile V, and FIG. 25B is a rear perspective view of automobile V. Camera module A described in the embodiment is mounted on automobile V as in-vehicle camera module VC. As shown in FIGS. 25A and 25B, for example, in-vehicle camera module VC is mounted on a windshield so as to face forward or is mounted on a rear gate so as to face backward. In-vehicle camera module VC is used for a back monitor, a drive recorder, collision avoidance control, automatic drive control, and the like.

Further, the configuration of the AF coil, the AF magnets, the OIS coils, and the OIS magnets is not limited to that disclosed in the embodiment. For example, the driving magnets, which are also used as the AF magnets and the OIS magnets, may have a rectangular parallelepiped shape and may be arranged around the AF coil so that the magnetization directions of the driving magnets correspond to the radial direction. Furthermore, a flat AF coil may be disposed around the lens part so that the surface of the coil is parallel to the optical-axis direction, and the driving magnets having a rectangular parallelepiped shape may be arranged so that the magnetization directions of the driving magnets cross the surface of the AF coil.

A case where the driving magnets are also used as the AF magnets and the OIS magnets in a lens driving device having an OIS function and an AF function has been described in the embodiment, but the AF magnets and the OIS magnets may be provided separately. Further, the present invention can be applied to a lens driving device having only an OIS function, that is, a lens driving device of which the image formation side of each OIS magnet in the optical-axis direction is opened (not supported by the magnet holder) and each OIS magnet is fixed to the magnet holder by adhesion.

The embodiment disclosed herein is merely an exemplification in every respect and should not be considered as limitative. The scope of the present invention is specified by the claims, not by the above-mentioned description. The scope of the present invention is intended to include all modifications in so far as they are within the scope of the appended claims or the equivalents thereof.

REFERENCE SIGNS LIST

1 Lens driving device
2 Lens part
3 Cover
10 OIS Movable part (AF driving part)
11 AF Movable part
12 AF Fixing part
13 Upper elastic support part (AF support part)
14 Lower elastic support part (AF support part)
15 Position detection magnet
16 AF Control part
17, 171, 172 AF power supply line
20 OIS fixing part
21 Base
22 Coil base plate
30 OIS support part
31A, 31B Signal suspension wire
32A, 32B Power-feed suspension wire
111 Lens holder
112 AF coil
121 Magnet holder
122 Driving magnet (AF magnet, OIS magnet)
122A to 122D Magnet
131, 132 Upper spring (AF signal line)
141, 142 Lower spring (coil power supply line)
161 Control IC
162a, 162b Power output terminal
162c, 162d Power input terminal
162e, 162f Signal input terminal
163 Bypass capacitor
165 Hall element
166 AF printed circuit board
221 OIS coil
M Smartphone
A Camera module

The invention claimed is:

1. A lens driving device, comprising:
an optical image stabilization driving part that includes: optical image stabilization magnets disposed around a lens part; and an optical image stabilization coil disposed so as to be spaced apart from the optical image stabilization magnets in an optical-axis direction, the optical image stabilization driving part being configured to cause an optical image stabilization movable part including the optical image stabilization magnets to sway in a plane orthogonal to the optical-axis direction with respect to an optical image stabilization fixing part including the optical image stabilization coil, wherein
the optical image stabilization movable part includes a magnet holder to which the optical image stabilization magnets are fixed by adhesion, wherein:
adhesion surfaces of the magnet holder to which the optical image stabilization magnets adhere are parallel to the optical-axis direction, and first end portions of the adhesion surfaces facing the optical image stabilization fixing part in the optical-axis direction are opened, and
each of the adhesion surfaces includes a recessed portion that extends in the optical-axis direction from an inner side relative to the first end portion toward a second end portion on a side opposite to the first end portion.

2. The lens driving device according to claim 1, wherein the magnet holder is formed by injection molding using a mold.

3. The lens driving device according to claim 2, wherein the mold includes a mold body and a pin that is disposed in an embedded structure of being placed in the mold body, and
the recessed portion is formed by the pin.

4. The lens driving device according to claim 1, wherein the recessed portion has a semicircular cross-section.

5. The lens driving device according to claim 1, wherein the adhesion surface includes a plurality of the recessed portions.

6. The lens driving device according to claim 1,
wherein the magnet holder includes an adhesive injection hole that communicates with the adhesion surface in a radial direction, and
the adhesive injection hole is closed by an adhesive.

7. The lens driving device according to claim 1,
wherein embossing is performed on the adhesion surface.

8. The lens driving device according to claim 1,
wherein the magnet holder is made of a liquid crystal polymer.

9. The lens driving device according to claim 1,
wherein the magnet holder has a substantially rectangular shape in plan view, and
the optical image stabilization magnets are disposed at four corners of the magnet holder.

10. The lens driving device according to claim 1, further comprising:
an auto-focusing driving part that includes an auto-focusing coil disposed around the lens part and auto-focusing magnets arranged so as to be spaced apart from the auto-focusing coil in a radial direction, the auto-focusing driving part being configured to move, in the optical-axis direction, an autofocus movable part including the auto-focusing coil with respect to an autofocus fixing part including the auto-focusing magnets,
wherein the optical image stabilization magnets are arranged on the autofocus fixing part.

11. The lens driving device according to claim 10,
wherein the optical image stabilization magnets are also used as the auto-focusing magnets.

12. A camera module, comprising:
the lens driving device according to claim 1;
the lens part that is mounted on the optical image stabilization movable part; and
a capturing part that captures a subject image formed by the lens part.

13. A camera-mounted device that is an information device or a transporting device, the camera-mounted device comprising:
the camera module according to claim 12; and
an image processing part that processes image information obtained by the camera module.

* * * * *